US012614515B2

(12) United States Patent
Zhang

(10) Patent No.: US 12,614,515 B2
(45) Date of Patent: Apr. 28, 2026

(54) DISPLAY PANEL AND DISPLAY DEVICE

(71) Applicant: BOE TECHNOLOGY GROUP CO., LTD., Beijing (CN)

(72) Inventor: Hao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/841,584

(22) PCT Filed: Dec. 28, 2023

(86) PCT No.: PCT/CN2023/142634

§ 371 (c)(1),
(2) Date: Aug. 26, 2024

(87) PCT Pub. No.: WO2025/137983

PCT Pub. Date: Jul. 3, 2025

(65) Prior Publication Data

US 2025/0322793 A1 Oct. 16, 2025

(51) Int. Cl.
*G09G 3/3233* (2016.01)

(52) U.S. Cl.
CPC ... *G09G 3/3233* (2013.01); *G09G 2300/0819* (2013.01); *G09G 2330/021* (2013.01)

(58) Field of Classification Search
None
See application file for complete search history.

(56) References Cited

U.S. PATENT DOCUMENTS

2005/0206590 A1* 9/2005 Sasaki .................. G09G 3/3233 345/76
2005/0275614 A1* 12/2005 Kim ..................... G11C 19/184 345/100
2008/0266275 A1* 10/2008 Tsai ..................... G09G 3/3677 345/204
2010/0164847 A1* 7/2010 Lee ...................... G09G 3/3233 345/77

(Continued)

FOREIGN PATENT DOCUMENTS

CN 102222492 A 10/2011
CN 102436788 B 2/2014

(Continued)

*Primary Examiner* — Dorothy Harris
(74) *Attorney, Agent, or Firm* — Muncy, Geissler, Olds & Lowe, P.C.

(57) ABSTRACT

A display panel includes a plurality of rows and a plurality of columns of sub-pixels, a plurality of rows of scanning lines, a first driving module and a light emitting control signal generation module; the sub-pixel is electrically connected to the scanning line and are configured to access a display data voltage under the control of a scanning signal provided by the scanning line; the first driving module includes a plurality of stages of first driving circuits; the light emitting control signal generation module includes a plurality of stages of generation circuits; the first driving circuit is configured to provide a scanning signal for two adjacent rows of sub-pixels; the generation circuit provides a light emitting control signal for at least two rows of sub-pixels; the plurality of rows and the plurality of columns of sub-pixels include a plurality of first-type sub-pixel rows and a plurality of second-type sub-pixel rows.

19 Claims, 17 Drawing Sheets

(56) References Cited

U.S. PATENT DOCUMENTS

| | | | | |
|---|---|---|---|---|
| 2011/0241983 | A1* | 10/2011 | Chang | G09G 3/3648<br>359/613 |
| 2012/0050350 | A1* | 3/2012 | Matsui | G09G 3/3233<br>345/77 |
| 2013/0100007 | A1* | 4/2013 | Yamamoto | G09G 3/36<br>377/64 |
| 2014/0152629 | A1* | 6/2014 | So | G09G 3/3266<br>377/64 |
| 2015/0269889 | A1* | 9/2015 | Hsu | G09G 3/3266<br>345/76 |
| 2016/0351124 | A1* | 12/2016 | Kim | G09G 3/3241 |
| 2016/0379546 | A1* | 12/2016 | Kim | G09G 3/2092<br>345/213 |
| 2018/0144717 | A1* | 5/2018 | Kim | G09G 5/10 |
| 2018/0182300 | A1* | 6/2018 | Chen | G09G 3/3266 |
| 2019/0347987 | A1* | 11/2019 | Zhao | G09G 3/3225 |
| 2021/0057458 | A1* | 2/2021 | Kim | G09G 3/20 |
| 2021/0201816 | A1* | 7/2021 | Kim | G09G 3/3266 |
| 2021/0366354 | A1* | 11/2021 | Li | G09G 3/007 |
| 2022/0208059 | A1* | 6/2022 | Kim | G09G 3/3208 |
| 2022/0351666 | A1* | 11/2022 | Dong | G09G 3/20 |
| 2023/0351972 | A1* | 11/2023 | In | G09G 3/3233 |
| 2024/0274050 | A1* | 8/2024 | Liu | G09G 3/3266 |

FOREIGN PATENT DOCUMENTS

| | | | | | |
|---|---|---|---|---|---|
| CN | 105788529 | A | | 7/2016 | |
| CN | 109461407 | A | * | 3/2019 | G09G 3/3208 |
| CN | 111028764 | A | | 4/2020 | |
| CN | 114974133 | A | | 8/2022 | |
| CN | 115331634 | A | | 11/2022 | |
| CN | 116156940 | A | | 5/2023 | |
| KR | 20210079586 | A | | 6/2021 | |

* cited by examiner

DISPLAY PANEL AND DISPLAY DEVICE

CROSS-REFERENCE TO RELATED APPLICATION

The present disclosure is the U.S. national phase of PCT Application No. PCT/CN2023/142634 filed on Dec. 28, 2023, which is incorporated herein by reference in its entirety.

TECHNICAL FIELD

The present disclosure relates to the field of display technology, in particular to a display panel and a display device.

BACKGROUND

When performing anti-peeping design, only the anti-peeping row sub-pixels can be lit in anti-peeping mode, and only the shared row sub-pixels can be lit in sharing mode. Based on the above two modes, the number of rows of sub-pixels included in the display panel can be doubled; since the number of rows of sub-pixels included in the display panel is doubled and the display frequency is fixed, if the progressive scanning method is adopted, the time for charging the sub-pixels through the data voltage is half of the sub-pixel charging time of the normal display panel, and the problem of uneven display caused by insufficient charging time may be encountered.

SUMMARY

In one aspect, the present disclosure provides in some embodiments a display panel, comprising a plurality of rows and a plurality of columns of sub-pixels, a plurality of rows of scanning lines, a first driving module and a light emitting control signal generation module; wherein the sub-pixel is electrically connected to the scanning line and are configured to access a display data voltage under the control of a scanning signal provided by the scanning line; the first driving module includes a plurality of stages of first driving circuits; the light emitting control signal generation module includes a plurality of stages of generation circuits; the first driving circuit is configured to provide a scanning signal for two adjacent rows of sub-pixels; the generation circuit is configured to provide a light emitting control signal for at least two rows of sub-pixels; the plurality of rows and the plurality of columns of sub-pixels include a plurality of first-type sub-pixel rows and a plurality of second-type sub-pixel rows; a type of the first-type sub-pixel row is different from a type of the second-type sub-pixel row.

Optionally, the first-type sub-pixel row and the second-type sub-pixel row are alternately arranged.

Optionally, the first-type sub-pixel row is an anti-peeping row of sub-pixels, and the second-type sub-pixel row is a shared row of sub-pixels; or, the first-type sub-pixel row is the shared row of sub-pixels, and the second-type sub-pixel row is the anti-peeping row of sub-pixels.

Optionally, the display panel further comprises a base substrate and a light-gathering structure; the sub-pixel, the light-gathering structure, the scanning line, the first driving module and the light emitting control signal generation module are all arranged on the base substrate; the light-gathering structure is arranged on a side of the anti-peeping row of sub-pixel away from the base substrate, and is configured to gather a light emitted by the anti-peeping row of sub-pixels.

Optionally, the sub-pixel is arranged in a display area; the first driving module is arranged in a peripheral area; the display panel comprises a first driving module, and the first driving module is arranged on a first side or a second side of the display area; or, the display panel comprises a first first driving module and a second first driving module, the first first driving module is arranged on the first side of the display area, and the second first driving module is arranged on the second side of the display area; the first side and the second side are opposite sides.

Optionally, the display panel further includes a plurality of rows of reset control lines and a second driving module; the second driving module includes an N stages of second driving circuits; the sub-pixel includes a reset circuit, a driving circuit and a light emitting element; the driving circuit is configured to generate a driving current for driving the light emitting element under the control of a potential of a control terminal of the driving circuit; the reset circuit is electrically connected to the reset control line, and is configured to provide an initial voltage to the control terminal of the driving circuit under the control of a reset control signal provided by the reset control line; an nth stage of second driving circuit is electrically connected to a (2n-1)th row reset control line and a 2nth row reset control line, respectively, and is configured to provide an nth reset control signal for the (2n-1)th row reset control line and the 2nth row reset control line; N is an integer greater than 1, n is a positive integer less than or equal to N.

Optionally, the sub-pixel is arranged in the display area; the second driving module is arranged in the peripheral area; the display panel includes a second driving module, and the second driving module is arranged on the first side or the second side of the display area; or, the display panel includes a first second driving module and a second second driving module, the first second driving module is arranged on the first side of the display area, and the second second driving module is arranged on the second side of the display area; the first side and the second side are opposite sides.

Optionally, the generation circuit includes a first generation circuit and a second generation circuit; the first generation circuit is configured to provide a light emitting control signal for at least one row of the first type of sub-pixel row; the second generation circuit is configured to provide a light emitting control signal for at least one row of the second type of sub-pixel row.

Optionally, the sub-pixel is arranged in the display area; the light emitting control signal generation module is arranged in the peripheral area; the display panel includes a light emitting control signal generation module, and the light emitting control signal generation module is arranged on the first side or the second side of the display area; or, the display panel includes a first light emitting control signal generation module and a second light emitting control signal generation module; the first light emitting control signal generation module is arranged on the first side of the display area; the second light emitting control signal generation module is arranged on the second side of the display area; the first side and the second side are opposite sides.

Optionally, the sub-pixel includes a driving circuit and a light emitting element; the driving circuit is configured to drive the light emitting element to emit light under the control of a potential of the control terminal of the driving circuit; the sub-pixel also includes a first light emitting control circuit and/or a second light emitting control circuit;

the first light emitting control circuit is electrically connected to the light emitting control line, the power supply voltage terminal and the first terminal of the driving circuit respectively, and is configured to control to connect or disconnect the power supply voltage terminal and the first terminal of the driving circuit under the control of the light emitting control signal provided by the light emitting control line; the second light emitting control circuit is electrically connected to the light emitting control line, the second terminal of the driving circuit and the light emitting element respectively, and is configured to control to connect or disconnect the second terminal of the driving circuit and the light emitting element under the control of the light emitting control signal provided by the light emitting control line.

Optionally, the nth stage of first generation circuit is electrically connected to the (2n-1)th row light emitting control line, and is configured to provide a (2n-1)th row light emitting control signal for the (2n-1)th row light emitting control line; the nth stage of second generation circuit is electrically connected to the 2nth row light emitting control line, and is configured to provide a 2nth row light emitting control signal for the 2nth row light emitting control line; n is a positive integer less than or equal to N, and N is an integer greater than 1; the (2n-1)th row light emitting control line is electrically connected to the (2n-1)th row of sub-pixels, and the 2nth row light emitting control line is electrically connected to the 2nth row of sub-pixels; the (2n-1)th row of sub-pixels are a first type sub-pixel row, and the 2nth row of sub-pixels are a second type sub-pixel row.

Optionally, an ath stage of first generation circuit is electrically connected to an (4a-3)th row light emitting control lines and an (4a-1)th row light emitting control lines, respectively, and is configured to provide light emitting control signals for the (4a-3)th row light emitting control line and the (4a-1)th row light emitting control line; an ath stage of second generation circuit is electrically connected to a (4a-2)th row light emitting control line and a 4ath row light emitting control line, respectively, and is configured to provide light emitting control signals for the (4a-2)th row light emitting control line and the 4ath row light emitting control line; a is a positive integer; the (4a-1)th row light emitting control line is electrically connected to the (4a-1)th row of sub-pixels, the (4a-2)th row light emitting control line is electrically connected to the (4a-2)th row of sub-pixels, the (4a-3)th row light emitting control line is electrically connected to the (4a-3)th row of sub-pixels, and the 4ath row light emitting control line is electrically connected to the 4ath row of sub-pixels; the (4a-1)th row of sub-pixels and the (4a-3)th row of sub-pixels are the first type of sub-pixel row, and the (4a-2)th row of sub-pixels and the 4ath row of sub-pixels are the second type of sub-pixel row.

Optionally, an ath stage of first generation circuit is electrically connected to a (6a-5)th row light emitting control line, a (6a-3)th row light emitting control line and a (6a-5)th row light emitting control line, respectively, and is configured to provide light emitting control signals for the (6a-5)th row light emitting control line, the (6a-3)th row light emitting control line and the (6a-5)th row light emitting control line; the ath stage of second generation circuit is electrically connected to a (6a-4)th row light emitting control line, a (6a-2)th row light emitting control line and a 6ath row light emitting control line, respectively, and is configured to provide light emitting control signals for the (6a-4)th row light emitting control line, the (6a-2)th row light emitting control line and the 6ath row light emitting control line; a is a positive integer; the (6a-5)th row light emitting control line is electrically connected to the (6a-5)th row of sub-pixels, the (6a-4)th row light emitting control line is electrically connected to the (6a-4)th row of sub-pixels, the (6a-3)th row light emitting control line is electrically connected to the (6a-3)th row of sub-pixels, the (6a-2)th row light emitting control line is electrically connected to the (6a-2)th row of sub-pixels, the (6a-1)th row light emitting control line is electrically connected to the (6a-1)th row of sub-pixels, and the 6ath row light emitting control line is electrically connected to the 6ath row of sub-pixels; the (6a-5)th row of sub-pixels, the (6a-3)th row of sub-pixels and the (6a-1)th row of sub-pixels are the first type of sub-pixel row, and the (6a-4)th row of sub-pixels, the (6a-2)th row of sub-pixels and the 6ath row of sub-pixel are the second type of sub-pixel row.

Optionally, a ath stage of first generation circuit is electrically connected to a (8a-7)th row light emitting control line, a (8a-5)th row light emitting control line, a (8a-3)th row light emitting control line and a (8a-1)th row light emitting control line, respectively, and is configured to provide light emitting control signals for the (8a-7)th row light emitting control line, the (8a-5)th row light emitting control line, the (8a-3)th row light emitting control line and the (8a-1)th row light emitting control line; an ath stage of second generation circuit is electrically connected to a (8a-6)th row light emitting control line, a (8a-4)th row light emitting control line, a (8a-2)th row light emitting control line and a 8ath row light emitting control line, respectively, and is configured to provide light emitting control signals for the (8a-6)th row light emitting control line, the (8a-4)th row light emitting control line, the (8a-2)th row light emitting control line and the 8ath row light emitting control line; a is a positive integer; the (8a-7)th row light emitting control line is electrically connected to the (8a-7)th row of sub-pixels, and the (8a-6)th row light emitting control line is electrically connected to the (8a-6)th row of sub-pixels, the (8a-5)th row light emitting control line is electrically connected to the (8a-5)th row of sub-pixels, the (8a-4)th row light emitting control line is electrically connected to the (8a-4)th row of sub-pixels, the (8a-3)th row light emitting control line is electrically connected to the (8a-3)th row of sub-pixels, the (8a-2)th row light emitting control line is electrically connected to the (8a-2)th row of sub-pixels, the (8a-1)th row light emitting control line is electrically connected to the (8a-1)th row of sub-pixels, and the 8ath row light emitting control line is electrically connected to the 8ath row of sub-pixels; the (8a-7)th row of sub-pixels, the (8a-5)th row of sub-pixels, the (8a-3)th row of sub-pixels and the (8a-1)th row of sub-pixels are the first type of sub-pixel row, and the (8a-6)th row of sub-pixels, the (8a-4)th row of sub-pixels, the (8a-2)th row of sub-pixels and the 8ath row of sub-pixels are the second type of sub-pixel row.

Optionally, the generation circuit is configured to provide a light emitting control signal for at least one first type sub-pixel row and at least one second type sub-pixel row.

Optionally, the nth stage of generation circuit includes an nth stage of generation unit and an nth stage of output control unit; the nth stage of generation unit is configured to generate an nth light emitting control signal, and output the nth light emitting control signal through the nth light emitting control signal output terminal; an input terminal of the nth stage of output control unit is electrically connected to the nth light emitting control signal output terminal, a first output terminal of the nth stage of output control unit is electrically connected to the (2n-1)th row light emitting control line, a second output terminal of the nth stage of output control unit is electrically connected to the 2nth row light emitting control line, and the nth stage of output control unit is configured to provide effective light emitting control signals to the (2n-1)th row light emitting control line and the 2nth row light emitting control line in a time division mode according to the nth light emitting control signal provided by the nth light emitting control signal output terminal; n is an integer less than or equal to N, and N is an integer greater than 1.

Optionally, the (2n-1)th row light emitting control line is electrically connected to the (2n-1)th row of sub-pixels, and the 2nth row light emitting control line is electrically connected to the 2nth row of sub-pixels; the (2n-1)th row of sub-pixels are a first type of sub-pixel row, and the 2nth row of sub-pixels are a second type of sub-pixel row.

Optionally, the output control unit includes a first control module, a second control module, a third control module and a fourth control module; the first control module is electrically connected to the first control terminal, the input terminal of the output control unit and the first output terminal of the output control unit respectively, and is configured to control to connect the input terminal and the first output terminal under the control of the first control signal provided by the first control terminal; the second control module is electrically connected to the second control terminal, the first voltage line and the first output terminal of the output control unit respectively, and is configured to control to connect the first voltage line and the first output terminal under the control of the second control signal provided by the second control terminal; the third control module is electrically connected to the first control terminal, the first voltage line and the second output terminal of the output control unit respectively, and is configured to control to connect the first voltage line and the second output terminal under the control of the first control signal provided by the first control terminal; the fourth control module is electrically connected to the second control terminal, the input terminal and the second output terminal respectively, and is configured to control to connect the input terminal and the second output terminal under the control of the second control signal provided by the second control terminal.

Optionally, the first control module includes a first control transistor, the second control module includes a second control transistor, the third control module includes a third control transistor, and the fourth control module includes a fourth control transistor; a gate electrode of the first control transistor is electrically connected to the first control terminal, a first electrode of the first control transistor is electrically connected to the input terminal of the output control unit, and a second electrode of the first control transistor is electrically connected to the first output terminal of the output control unit; a gate electrode of the second control transistor is electrically connected to the second control terminal, a first electrode of the second control transistor is electrically connected to the first voltage line, and a second electrode of the second control transistor is electrically connected to the first output terminal of the output control unit; a gate electrode of the third control transistor is electrically connected to the first control terminal, a first electrode of the third control transistor is electrically connected to the first voltage line, and a second electrode of the third control transistor is electrically connected to the second output terminal of the output control unit; a gate electrode of the fourth control transistor is electrically connected to the second control terminal, a first electrode of the fourth control transistor is electrically connected to the input terminal of the output control unit, and a second electrode of the fourth control transistor is electrically connected to the second output terminal of the output control unit.

Optionally, the sub-pixel comprises a light emitting element, a driving circuit, a data writing-in circuit, a reset circuit, a first light emitting control circuit and a second light emitting control circuit; a control terminal of the driving circuit is electrically connected to a first node, a first terminal of the driving circuit is electrically connected to a second node, and a second terminal of the driving circuit is electrically connected to a third node; the data writing-in circuit is electrically connected to the scanning line, the data line and the second node N2 respectively, and is configured to write a display data voltage provided by the data line into the second node under the control of the scanning signal provided by the scanning line; the reset circuit is electrically connected to the reset control line, the first initial voltage terminal and the first node respectively, and is configured to write the first initial voltage provided by the first initial voltage terminal into the first node under the control of the reset control signal provided by the reset control line RE; the first light emitting control circuit is electrically connected to the light emitting control line, the power supply voltage terminal and the second node respectively, and is configured to control to connect or disconnect the power supply voltage terminal and the second node under the control of the light emitting control signal provided by the light emitting control line; the second light emitting control circuit is electrically connected to the light emitting control line, the third node and the first electrode of the light emitting element respectively, and is configured to control to connect or disconnect the third node and the first electrode of the light emitting element under the control of the light emitting control signal; the second electrode of the light emitting element is electrically connected to the first voltage terminal.

Optionally, the focusing structure includes a microlens and/or a light shading structure; the light shading structure surrounds an opening area corresponding to the anti-peeping row of sub-pixels.

In a second aspect, an embodiment of the present disclosure provides a display device, comprising a display panel.

DETAILED DESCRIPTION

Figure 1:
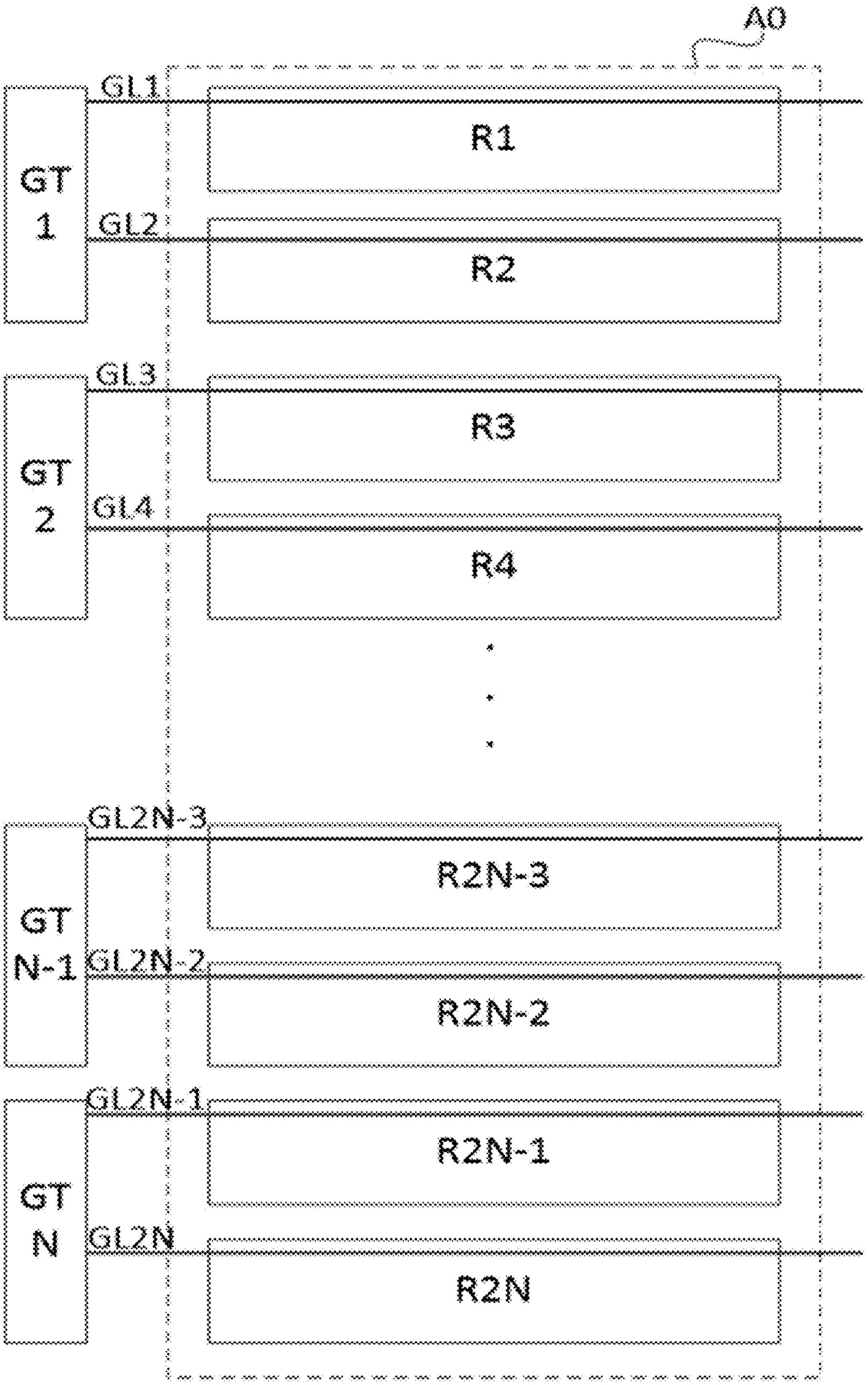
FIG. 1 is a structural diagram of a display panel according to at least one embodiment of the present disclosure.

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without making creative efforts fall within the scope of protection of the present disclosure.

The transistors used in all embodiments of the present disclosure may be thin film transistors, field effect transistors, or other devices with the same characteristics. In the embodiment of the present disclosure, in order to distinguish the two electrodes of the transistor except the gate electrode, one electrode is called the first electrode and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

The display panel described in the embodiment of the present disclosure includes a plurality of rows and a plurality of columns of sub-pixels, a plurality of rows of scanning line, a first driving module and a light emitting control signal generation module;

The sub-pixels are electrically connected to the scanning line and are configured to access the display data voltage under the control of the scanning signals provided by the scanning line;

The first driving module includes a plurality of stages of first driving circuits; the light emitting control signal generation module includes a plurality of stages of generation circuits;

The first driving circuit is configured to provide scanning signals for two adjacent rows of sub-pixels;

The generation circuit is configured to provide light emitting control signals for at least two rows of sub-pixels;

The plurality of rows and the plurality of columns of sub-pixels include a plurality of first-type sub-pixel rows and a plurality of second-type sub-pixel rows;

The type of the first-type sub-pixel row is different from the type of the second-type sub-pixel row.

Optionally, the first-type sub-pixel row can be an anti-peeping row sub-pixel, and the second-type sub-pixel row can be a shared row sub-pixel; or, the first-type sub-pixel row can be a shared row sub-pixel, and the second-type sub-pixel row can be an anti-peeping row sub-pixel.

The display panel described in at least one embodiment of the present disclosure may also include a base substrate and a light-gathering structure;

The sub-pixels, the light-gathering structure, the scanning lines, the first driving module and the light emitting control signal generation module are all arranged on the base substrate;

The light-gathering structure is arranged on a side of the anti-peeping sub-pixel away from the base substrate, and is configured to gather the light emitted by the anti-peeping sub-pixel.

When performing anti-peeping design, six sub-pixels in two rows and three columns can be designed in one pixel space. The three columns of sub-pixels in the first row are red sub-pixels, green sub-pixels and blue sub-pixels respectively, and the three columns of sub-pixels in the second row are red sub-pixels, green sub-pixels and blue sub-pixels respectively;

In anti-peeping mode, only the anti-peeping row sub-pixels are lit, and in sharing mode, only the shared row sub-pixels are lit; the anti-peeping row sub-pixels can be the first row sub-pixels or the second row sub-pixels, and the shared row sub-pixels can be the second row sub-pixels or the first row sub-pixels;

A micro-lens and other structures are designed in the encapsulation layer above the light emitting element in the anti-peeping row sub-pixel, which plays a role in gathering the light emitted by the light emitting element. At the same time, a light-shielding layer is set above the anti-peeping row sub-pixel, and the light-shielding layer surrounds the corresponding pixel opening area, so that the light emitting angle of the light emitting element in the anti-peeping row sub-pixel can be reduced to achieve an anti-peeping effect; there is no light-gathering structure design above the light emitting element of the shared row sub-pixel, and the light emitting of the shared row sub-pixel can achieve a large angle to achieve a sharing effect.

Based on the above two modes, the number of rows of sub-pixels included in the display panel can be doubled, and the sub-pixels in the odd rows can be set as anti-peeping sub-pixels, and the sub-pixels in the even rows can be set as shared sub-pixels; or, the sub-pixels in the even rows can be set as anti-peeping sub-pixels, and the sub-pixels in the odd rows can be set as shared sub-pixels;

When the resolution of the display panel is N×M (N and M are positive integers), the display panel can be set to include 2N rows of sub-pixels;

Since the number of rows of sub-pixels included in the display panel is doubled and the display frequency is fixed, if a progressive scanning method is adopted, the time for charging the sub-pixels through the data voltage is half of the sub-pixel charging time of the normal display panel, and the problem of uneven display caused by insufficient charging time may be encountered; when the anti-peeping row sub-pixels or the shared row sub-pixels are lit, they need to be lit alternately, so that the data voltage needs to be adjusted to the black screen voltage alternately, and the power consumption of the data voltage will increase.

In at least one embodiment of the present disclosure, an odd-numbered row sub-pixel refers to the sub-pixel located in an odd-numbered row calculated from the actual light emitting sub-pixel, and an even-numbered row sub-pixel refers to a sub-pixel located in an even-numbered row calculated from the actual emitting sub-pixel, and the number of rows of dummy (virtual) sub-pixels is not counted.

Based on the above problem, the display panel described in at least one embodiment of the present disclosure includes plurality of rows of scanning line and a first driving module, the first driving module includes an N stages of first driving circuits, the nth stage of first driving circuit provides the nth scanning signal for the (2n-1)th row scanning line and the 2nth row scanning line, and the same scanning signal is provided to the two adjacent rows of sub-pixels through one stage of first driving circuit. The sub-pixels are connected to the display data voltage under the control of the scanning signal, so that the charging time for each row of sub-pixels will be doubled. In the light emitting phase, in the anti-peeping mode, the light emitting control signal generation module for light emitting control controls the light emitting of the anti-peeping row sub-pixels, and in the sharing mode, the light emitting control signal generation module for light emitting control controls the light emitting of the shared row sub-pixels. The embodiment of the present disclosure can increase the charging time and save the power consumption of the data voltage.

In at least one embodiment of the present disclosure, the first type of sub-pixel row and the second type of sub-pixel row can be arranged alternately, but not limited to this.

Optionally, the light gathering structure may include a microlens and/or a light shading structure;

The light shading structure surrounds the opening area corresponding to the anti-peep row sub-pixels.

In at least one embodiment of the present disclosure, compared with the relevant display panel, the number of rows of sub-pixels used is doubled, and the height of each row of sub-pixels becomes smaller.

For example, when the PPI (pixel density) of the relevant display panel is 208, the height of each row of sub-pixels can be 122.1 μm, then when the technology in at least one embodiment of the present disclosure is used, the height of each row of sub-pixels can be half of the original height, that is, the height of each row of sub-pixels can be 62.05 μm.

As shown in FIG. 1, the one labeled A0 is the display area;

The one labeled R1 is the first row of sub-pixels, the one labeled R2 is the second row of sub-pixels, the one labeled R3 is the third row of sub-pixels, the one labeled R4 is the fourth row of sub-pixels, the one labeled R2N-3 is the (2N-3)th row of sub-pixels, the one labeled R2N-2 is the (2N-2)th row of sub-pixels, the one labeled R2N-1 is the (2N-1)th row of sub-pixels, and the one labeled R2N is the 2Nth row of sub-pixels;

The display panel described in at least one embodiment of the present disclosure may include the first row scanning line GL1, the second row scanning line GL2, the third row scanning line GL3, the fourth row scanning line GL4, the (2N-3)th row scanning line GL2N-3, the (2N-2)th row scanning line GL2N-1, and the (2N-1)th row scanning line GL2N-2, (2N-1)th row scanning line GL2N-1 and 2Nth row scanning line GL2N;

As shown in FIG. 1, the display panel described in at least one embodiment of the present disclosure may include a first driving module, and the first driving module may include a first stage of first driving circuit GT1, a second stage of first driving circuit GT2, an (N-1)th stage of first driving circuit GTN-1 and an Nth stage of first driving circuit GTN;

The first stage of first driving circuit GT1, the second stage of first driving circuit GT2, the (N-1)th stage of first driving circuit GTN-1 and the N stage of first driving circuit GTN are arranged on the left side of the display area A0;

GT1 is electrically connected to GL1 and GL2, GT2 is electrically connected to GL3 and GL4, GTN-1 is electrically connected to GL2N-3 and GL2N-2, and GTN is electrically connected to GL2N-1 and GL2N;

GT1 is configured to provide the first scanning signal for GL1 and GL2;

GT2 is configured to provide the second scanning signal for GL3 and GL4;

GTN-1 is configured to provide the N-1 scanning signal for GL2N-3 and GL2N-2;

GTN is configured to provide the N scanning signal for GL2N-1 and GL2N.

Figure 2:
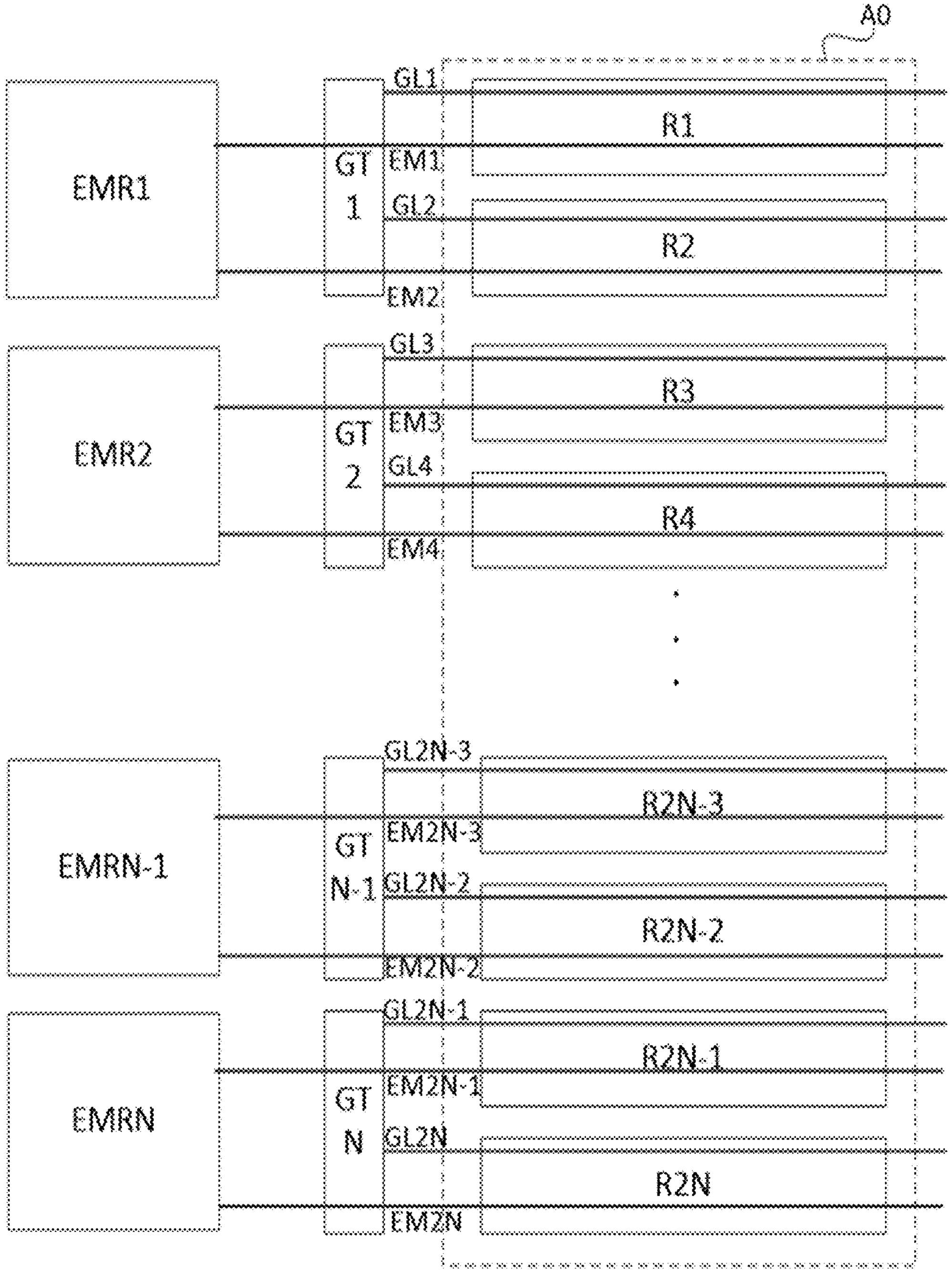
FIG. 2 is a structural diagram of a display panel according to at least one embodiment of the present disclosure.

As shown in FIG. 2, based on at least one embodiment of the display panel shown in FIG. 1, the display panel described in at least one embodiment of the present disclosure may include a light emitting control signal generation module;

The light emitting control signal generation module may include a first stage of generation circuit EMR1, a second stage of generation circuit EMR2, an (N-1)th stage of generation circuit EMRN-1, and an Nth stage of generation circuit EMRN;

EMR1, EMR2, EMRN-1, and EMRN are all arranged on the left side of the display area A0;

EMR1 is electrically connected to the first row light emitting control lines EM1 and the second row light emitting control lines EM2, and is configured to provide light emitting control signals for the first row light emitting control line EM1 and the second row light emitting control line EM2;

EMR2 is electrically connected to the third row light emitting control line EM3 and the fourth row light emitting control line EM4, and is configured to provide light emitting control signals for the third row light emitting control line EM3 and the fourth row light emitting control line EM4;

EMRN-1 is electrically connected to the (2N-3)th row light emitting control line EM2N-3 and the (2N-2)th row light emitting control line EM2N-2, and is configured to provide light emitting control signals for the (2N-3)th row light emitting control line EM2N-3 and the (2N-2)th row light emitting control line EM2N-2;

EMRN is electrically connected to the (2N-1)th row light emitting control line EM2N-1 and the 2Nth row light emitting control line EM2N, and is configured to provide light emitting control signals for the (2N-1)th row light emitting control line EM2N-1 and the 2Nth row light emitting control line EM2N.

Figure 3:
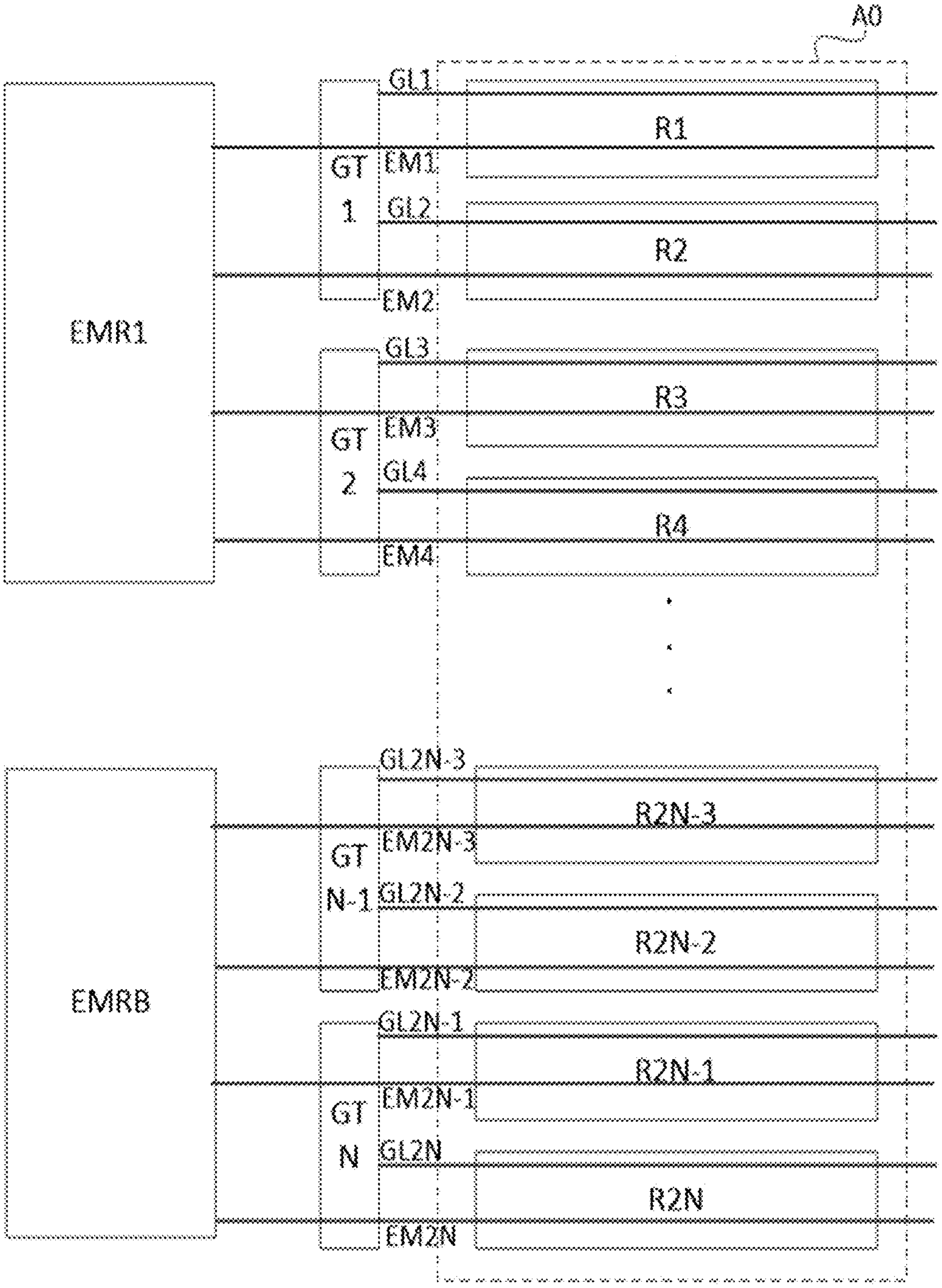
FIG. 3 is a structural diagram of a display panel according to at least one embodiment of the present disclosure.

As shown in FIG. 3, based on at least one embodiment of the display panel shown in FIG. 1, the display panel described in at least one embodiment of the present disclosure may include a light emitting control signal generation module;

The light emitting control signal generation module may include a first stage of generation circuit EMR1 and a Bth stage of generation circuit EMRB; B is a positive integer;

EMR1 and EMRB are both arranged on the left side of the display area A0;

EMR1 is electrically connected to the first row light emitting control line EM1, the second row light emitting control line EM2, the third row light emitting control line EM3 and the fourth row light emitting control line EM4, and is configured to generate a light emitting control signal for the first row light emitting control line EM1, the second row light emitting control line EM2, the third row light emitting control line EM3 and the fourth row light emitting control line EM4;

EMRB is electrically connected to the (2N-3)th row light emitting control line EM2N-3, the (2N-2)th row light emitting control line EM2N-2, the (2N-1)th row light emitting control line EM2N-1 and the 2Nth row light emitting control line EM2N, and is configured to provide light emitting control signals to the (2N-3)th row light emitting control line EM2N-3, the (2N-2)th row light emitting control line EM2N-2, the (2N-1)th row light emitting control line EM2N-1 and the 2Nth row light emitting control line EM2N.

In at least one embodiment of the present disclosure, the sub-pixel is arranged in the display area; the first driving module is arranged in the peripheral area;

The display panel includes a first driving module, and the first driving module is arranged on the first side or the second side of the display area; or, The display panel includes a first first driving module and a second first driving module, the first first driving module is arranged on the first side of the display area, and the second first driving module is arranged on the second side of the display area;

The first side and the second side are opposite sides.

In at least one embodiment shown in FIG. 1, a scanning signal is provided for two adjacent scanning lines through a first stage of first driving circuit, so as to increase the charging time for each row of sub-pixels, so that the charging time for each row of sub-pixels is doubled, and the data voltage does not need to jump to the black screen voltage every other line, thereby saving the power consumption of the data voltage.

In a specific implementation, the sub-pixel can be arranged in the display area, the first driving module can be arranged in the peripheral area, and the peripheral area surrounds the display area; the display panel can include a first driving module, and the first driving module can be arranged on the left or right side of the display area; or, the display panel can include a first first driving module and a second first driving module, the first first driving module is arranged on the left side of the display area, and the second first driving module is arranged on the right side of the display area.

Figure 4:
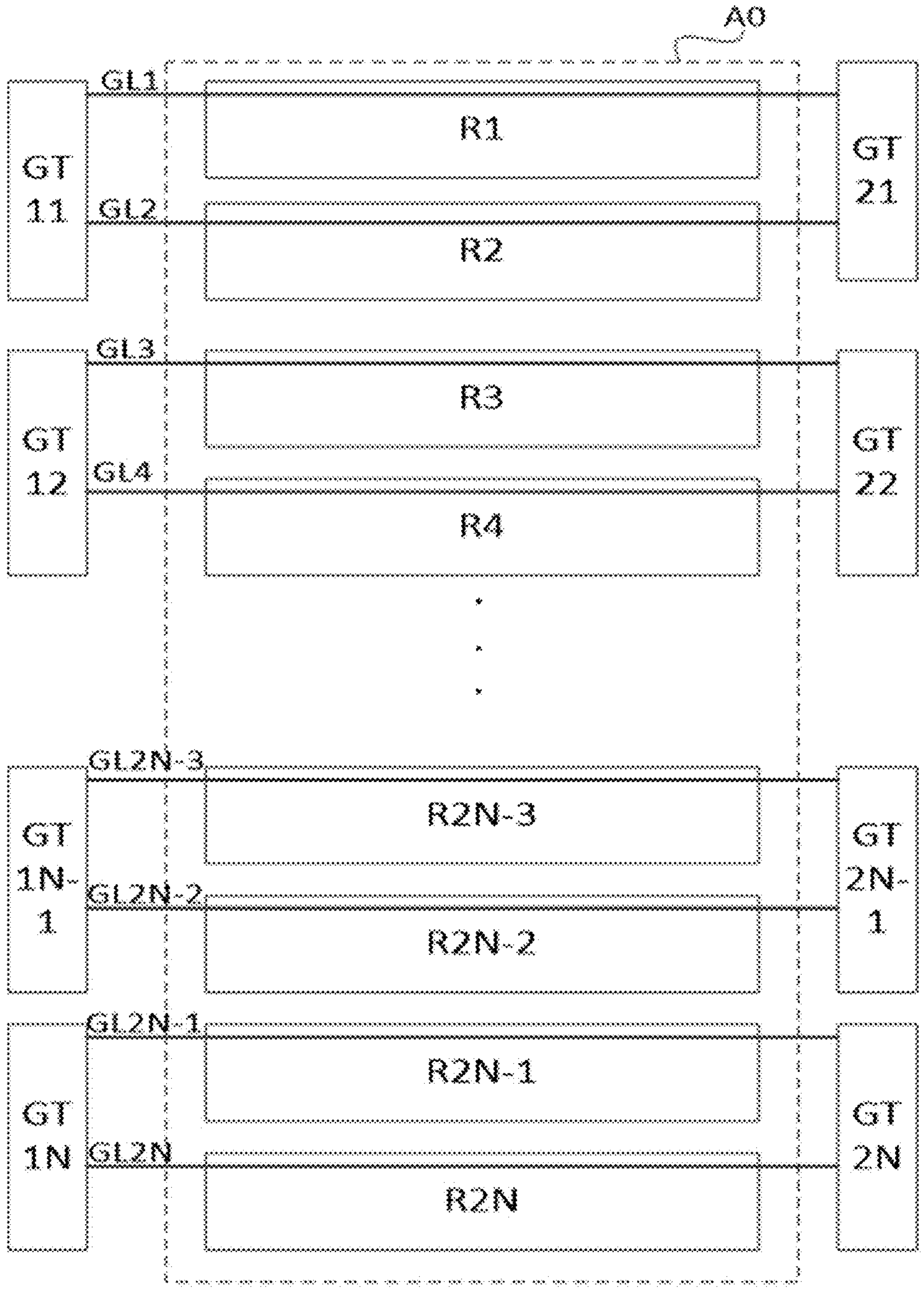
FIG. 4 is a structural diagram of a display panel according to at least one embodiment of the present disclosure.

As shown in FIG. 4, the one labeled A0 is the display area;

The one labeled R1 is the first row of sub-pixels, the one labeled R2 is the second row of sub-pixels, the one labeled R3 is the third row of sub-pixels, the one labeled R4 is the fourth row of sub-pixels, the one labeled R2N-3 is the (2N-3)th row of sub-pixels, the one labeled R2N-2 is the (2N-2)th row of sub-pixels, the one labeled R2N-1 is the (2N-1)th row of sub-pixels, and the one labeled R2N is the 2Nth row of sub-pixels;

The display panel described in at least one embodiment of the present disclosure may include the first row of scanning line GL1, the second row of scanning line GL2, the third row of scanning line GL3, the fourth row of scanning line GL4, the (2N-3)th row of scanning line GL2N-3, the (2N-2)th row of scanning line GL2N-2, the (2N-1)th row of scanning line GL2N-3, and the 2Nth row of scanning line GL2N;

The first row of sub-pixels R1 is electrically connected to GL1, the second row of sub-pixels R2 is electrically connected to GL2, the third row of sub-pixels R3 is electrically connected to GL3, the fourth row of sub-pixels R4 is electrically connected to GL4, the (2N-3)th row of sub-pixels R2N-3 is electrically connected to GL2N-3, the second row of sub-pixels R2N-2 is electrically connected to GL2N-2, the third row of sub-pixels R2N-1 is electrically connected to GL2N-1, and the fourth row of sub-pixels R2N is electrically connected to GL2N;

The display panel described in at least one embodiment of the present disclosure may include a first first driving module and a second first driving module;

The first first driving module includes a first stage of first driving circuit labeled GT11, and the first first driving module includes a second stage of first driving circuit labeled GT12, the first first driving module includes the (N-1)th stage of first driving circuit labeled GT1N-1, and the first first driving module includes the Nth stage of first driving circuit labeled GT1N;

The first stage of first driving circuit included in the second first driving module is labeled GT21, the second stage of first driving circuit included in the second first driving module is labeled GT22, the (N-1)th stage of first driving circuit included in the second first driving module is labeled GT2N-1, and the Nth stage of first driving circuit included in the second first driving module is labeled GT2N;

The first first driving module is set on the left side of the display area A0, and the second first driving module is set on the right side of display area A0;

GT11 is configured to provide the first first scanning signal for GL1 and GL2; GT21 is configured to provide the second first scanning signal for GL1 and GL2;

GT12 is configured to provide the first second scanning signal for GL3 and GL4; GT22 is configured to provide the second second scanning signal for GL3 and GL4;

GT1N-1 is configured to provide the first (N-1)th scanning signal for GL2N-3 and GL2N-2; GT2N-1 is configured to provide the second (N-1)th scanning signal for GL2N-3 and GL2N-2;

GT1N is configured to provide the first N scanning signal for GL2N-1 and GL2N; GT2N is configured to provide the second N scanning signal for GL2N-1 and GL2N.

In at least one embodiment shown in FIG. 4, a first driving circuit located on the left side of the display area and a first driving circuit located on the right side of the display area are configured to simultaneously provide scanning signals for two rows of adjacent scanning lines, so as to increase the charging time for each row of sub-pixels, so that the charging time for each row of sub-pixels is doubled, and the data voltage does not need to jump to the black screen voltage every other row, thereby saving power consumption of the data voltage.

The display panel described in at least one embodiment of the present disclosure also includes a plurality of rows of reset control lines and a second driving module; the second driving module includes an N stages of second driving circuits; the sub-pixel includes a reset circuit, a driving circuit and a light emitting element; the driving circuit is configured to generate a driving current for driving the light emitting element under the control of a potential of its control terminal;

The reset circuit is electrically connected to the reset control line, and is configured to provide the initial voltage to the control terminal of the driving circuit under the control of the reset control signal provided by the reset control line;

The nth stage of second driving circuit is electrically connected to the (2n-1)th row of reset control line and the 2nth row of reset control line, respectively, and is configured to provide the nth reset control signal for the (2n-1)th row of reset control line and the 2nth row of reset control line.

In at least one embodiment of the present disclosure, the display panel may also include plurality of rows of reset control lines and a second driving module, the second driving module includes N stages of second driving circuits, the nth stage of second driving circuit provides the nth reset control signal for the (2n-1)th row of reset control line and the 2nth reset control line, and the same reset control signal is provided for the adjacent two rows of reset control lines through one stage of second driving circuit, so as to reduce the number of stages of the second driving circuits, which is conducive to realizing a narrow frame; the reset circuit in the sub-pixel writes the initial voltage into the control terminal of the driving circuit in the sub-pixel under the control of the reset control signal, so as to reset the potential of the control terminal of the driving circuit.

Figure 5:
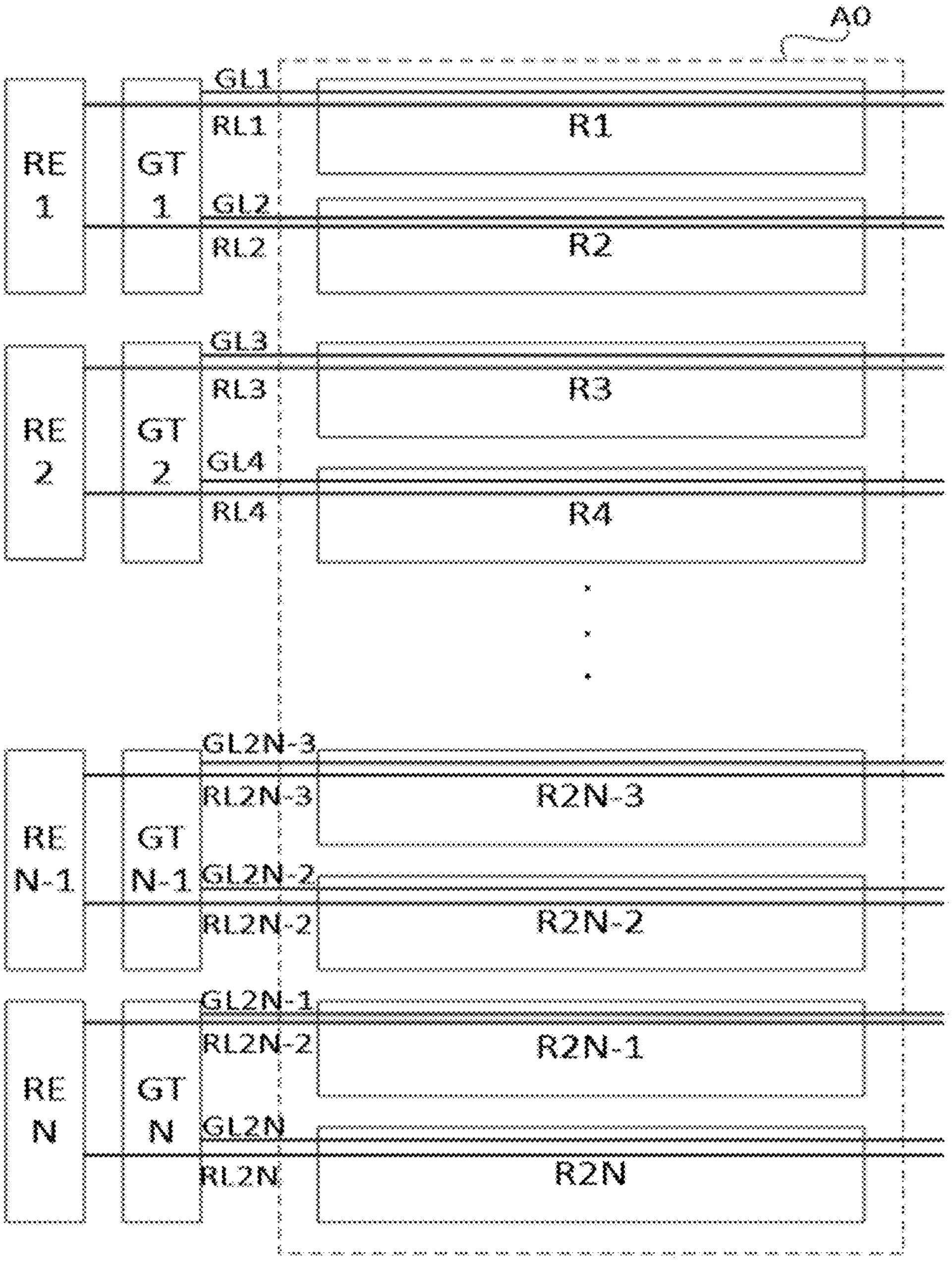
FIG. 5 is a structural diagram of a display panel according to at least one embodiment of the present disclosure.

As shown in FIG. 5, based on at least one embodiment of the display panel shown in FIG. 1, the display panel described in at least one embodiment of the present disclosure further includes a second driving module;

The display panel described in at least one embodiment of the present disclosure further includes a first row reset control line RL1, a second row reset control line RL2, a third row reset control line RL3, a fourth row reset control line RL4, a (2N-3)th row reset control line RL2N-3, a (2N-2)th row reset control line RL2N-2, a (2N-1)th row reset control line RL2N-1 and a 2Nth row reset control line RL2N;

The second driving module includes a first stage of second driving circuit RE1, a second stage of second driving circuit RE2, an (N-1)th stage of second driving circuit REN-1 and an Nth stage of second driving circuit REN;

The second driving module is arranged on the left side of the display area A0;

RE1 is configured to provide a first reset control signal for RL1 and RL2;

RE2 is configured to provide a second reset control signal for RL3 and RL4;

REN-1 is configured to provide an (N-1)th reset control signal for RL2N-3 and RL2N-2;

REN is configured to provide an Nth reset control signal for RL2N-1 and RL2N.

In at least one embodiment of the display panel shown in FIG. 5, a reset control signal is provided for two adjacent rows of sub-pixels through a first stage of second driving circuit, so as to cooperate with the scanning signal to improve the charging time of the sub-pixels.

Optionally, the sub-pixel is arranged in the display area; the second driving module is arranged in the peripheral area;

The display panel includes a second driving module, and the second driving module is arranged on the first side or the second side of the display area; or, The display panel includes a first second driving module and a second second driving module, the first second driving module is arranged on the first side of the display area, and the second second driving module is arranged on the second side of the display area;

The first side and the second side are opposite sides.

In a specific implementation, the display panel may include a second driving module, and the second driving module is arranged on the left side or the right side of the display area; or, the display panel may include a first second driving module and a second second driving module, the first second driving module is arranged on the left side of the display area, and the second second driving module is arranged on the right side of the display area.

Figure 6:
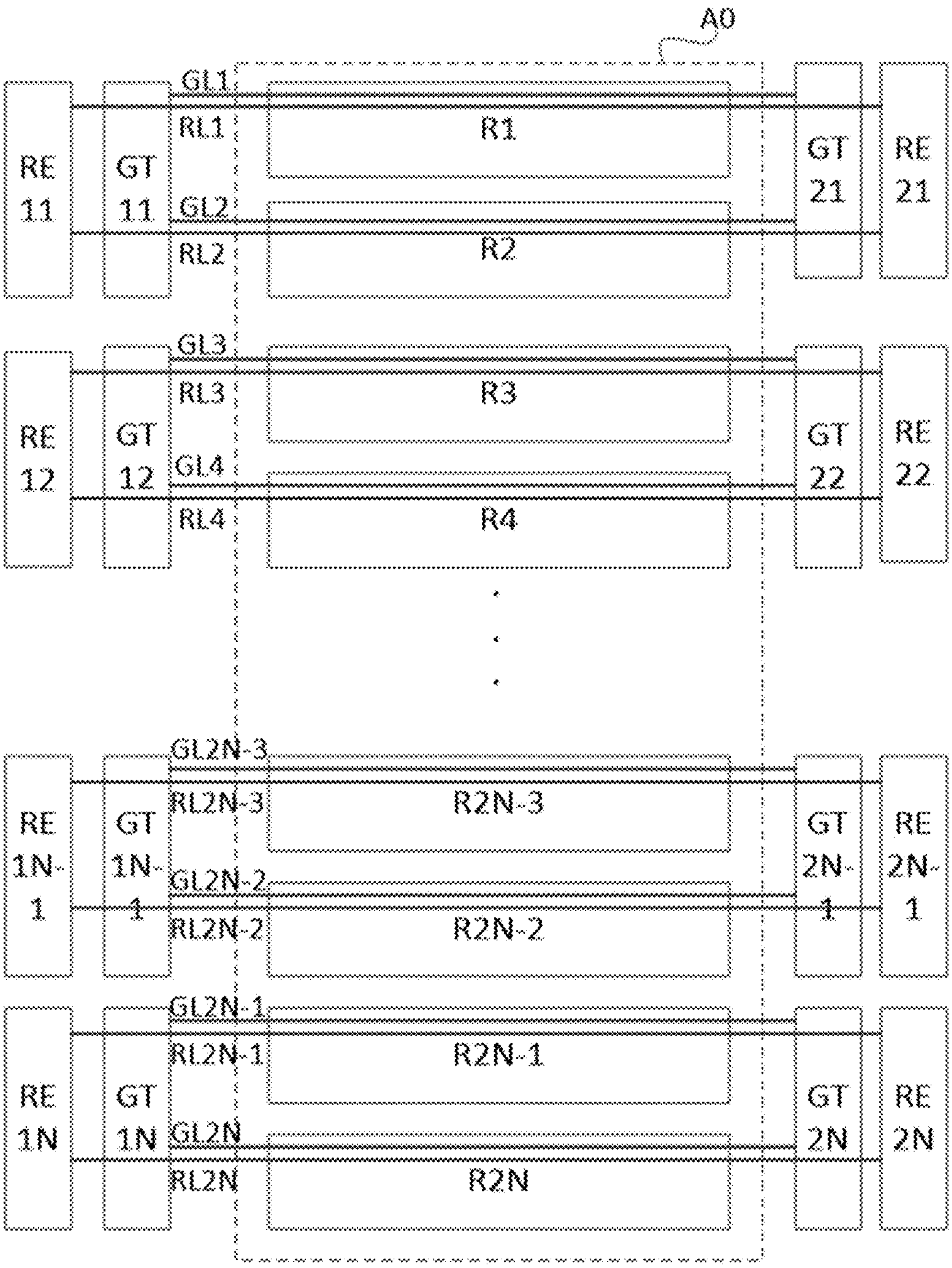
FIG. 6 is a structural diagram of a display panel according to at least one embodiment of the present disclosure.

As shown in FIG. 6, based on at least one embodiment of the display panel shown in FIG. 4, the display panel described in at least one embodiment of the present disclosure further includes a first second driving module and a second second driving module;

the display panel described in at least one embodiment of the present disclosure further includes a first row reset control line RL1, a second row reset control line RL2, a third row reset control line RL3, a fourth row reset control line RL4, a (2N-3)th row reset control line RL2N-3, a (2N-2)th row reset control line RL2N-2, a (2N-1)th row reset control line RL2N-1 and a 2Nth row reset control line RL2N;

The first second driving module includes the first stage of second driving circuit labeled RE11, the first second driving module includes the first stage of second driving circuit labeled RE12, the first second driving module includes the (N-1)th stage of second driving circuit labeled RE1N-1, and the first second driving module includes the Nth stage of second driving circuit labeled RE1N;

The second second driving module includes the first stage of second driving circuit labeled RE21, and the second second driving module includes the first stage of second driving circuit labeled RE22, the (N-1)th stage of second driving circuit included in the second second driving module is labeled RE2N-1, and the Nth stage of second driving circuit included in the second second driving module is labeled RE2N;

The first second driving module is arranged on the left side of the display area A0, and the second second driving module is arranged on the right side of the display area A0;

RE11 is configured to provide the first first reset control signal for RL1 and RL2; RE21 is configured to provide the second first reset control signal for RL1 and RL2;

RE12 is configured to provide the first second reset control signal for RL3 and RL4; RE22 is configured to provide the second second reset control signal for RL3 and RL4;

RE1N-1 is configured to provide the first (N-1)th reset control signal for RL2N-3 and RL2N-2; RE2N-1 is configured to provide the second (N-1)th reset control signal for RL2N-3 and RL2N-2;

RE1N is configured to provide the first Nth reset control signal for RL2N-1 and RL2N; RE2N is configured to provide the second Nth reset control signal for RL2N-1 and RL2N.

In at least one embodiment of the display panel shown in FIG. 6, the reset control signal is provided to two adjacent rows of sub-pixels at the same time by the first stage of second driving circuit located on the left side of the display area and the first stage of second driving circuit located on the right side of the display area, so as to cooperate with the scanning signal to improve the charging time of the sub-pixels.

In at least one embodiment of the present disclosure, the generation circuit may include a first generation circuit and a second generation circuit;

The first generation circuit is configured to provide a light emitting control signal for at least one row of the first type of sub-pixel row;

The second generation circuit is configured to provide a light emitting control signal for at least one row of the second type of sub-pixel row.

In a specific implementation, the generation circuit may include a first generation circuit and a second generation circuit; the first generation circuit provides a light emitting control signal for the first type of sub-pixel row; the second generation circuit provides a light emitting control signal for the second type of sub-pixel row.

For example, when the first type of sub-pixel row is an anti-peeping row sub-pixel and the second type of sub-pixel row is a shared row sub-pixel, the first generation circuit provides a light emitting control signal for the anti-peeping row sub-pixel; the second generation circuit provides a light emitting control signal for the shared row sub-pixel; the first generation circuit and the second generation circuit can provide effective light emitting control signals to the anti-peeping row light emitting control line and the shared row light emitting control line in time division mode to control the anti-peeping row sub-pixel and the shared row sub-pixel to emit light in time division mode, so as to realize the anti-peeping mode and the shared mode in time division mode;

When the first type of sub-pixel row is a shared row sub-pixel and the second type of sub-pixel row is an anti-peeping row sub-pixel, the first generation circuit provides a light emitting control signal for the shared row sub-pixel; the second generation circuit provides a light emitting control signal for the anti-peeping row sub-pixel; the first generation circuit and the second generation circuit can provide effective light emitting control signals to the shared row light emitting control line and the anti-peeping row light emitting control line in time division mode to control the shared row sub-pixel and the anti-peeping row sub-pixel to emit light in time division mode, so as to realize the shared mode and the anti-peeping mode in time division mode.

In a specific implementation, the sub-pixel is electrically connected to the light emitting control line; when the light emitting control line receives a valid light emitting control signal, the transistor for light emitting control in the sub-pixel electrically connected to the light emitting control line is turned on.

In at least one embodiment of the present disclosure, the sub-pixel is arranged in the display area; the light emitting control signal generation module is arranged in the peripheral area;

The display panel includes a light emitting control signal generation module, and the light emitting control signal generation module is arranged on the first side or the second side of the display area; or, The display panel includes a first light emitting control signal generation module and a second control signal generation module; the first light emitting control signal generation module is arranged on the first side of the display area; the second light emitting control signal generation module is arranged on the second side of the display area;

The first side and the second side are opposite sides.

In a specific implementation, the display panel may include a light emitting control signal generation module, which may be arranged on the left or right side of the display area; or, the display panel may include a first light emitting control signal generation module and a second light emitting control signal generation module; the first light emitting control signal generation module may be arranged on the left side of the display area; the second light emitting control signal generation module may be arranged on the right side of the display area.

Optionally, the sub-pixel includes a driving circuit and a light emitting element; the driving circuit is configured to generate a driving current for driving the light emitting element under the control of the potential of its control terminal;

The sub-pixel also includes a first light emitting control circuit and/or a second light emitting control circuit;

The first light emitting control circuit is electrically connected to the light emitting control line, the power supply voltage terminal and the first terminal of the driving circuit respectively, and is configured to control to connect or disconnect the power supply voltage terminal and the first terminal of the driving circuit under the control of the light emitting control signal provided by the light emitting control line;

The second light emitting control circuit is electrically connected to the light emitting control line, the second terminal of the driving circuit and the light emitting element respectively, and is configured to control to connect or disconnect the second terminal of the driving circuit and the light emitting element under the control of the light emitting control signal provided by the light emitting control line.

In a specific implementation, the sub-pixel may include a first light emitting control circuit and/or a second light emitting control circuit. The first light emitting control circuit controls to connect or disconnect the power supply voltage terminal and the first terminal of the driving circuit under the control of a light emitting control signal. The second light emitting control circuit controls to connect or disconnect the second terminal of the driving circuit and the light emitting element under the control of the light emitting control signal to perform light emitting control.

When the sub-pixel receives a valid light emitting control signal, the first light emitting control circuit controls to connect the power supply voltage terminal and the first terminal of the driving circuit under the control of the light emitting control signal. The second light emitting control circuit controls to connect the second terminal of the driving circuit and the light emitting element under the control of the light emitting control signal.

In at least one embodiment of the present disclosure, the nth stage of first generation circuit is electrically connected to the (2n-1)th row light emitting control line, and is configured to provide the (2n-1)th row light emitting control signal for the (2n-1)th row light emitting control line;

The nth stage of second generation circuit is electrically connected to the 2nth row light emitting control line, and is configured to provide the 2nth row light emitting control signal for the 2nth row light emitting control line;

n is a positive integer less than or equal to N, and N is an integer greater than 1;

The (2n-1)th row light emitting control line is electrically connected to the (2n-1)th row of sub-pixels, and the 2nth row light emitting control line is electrically connected to the 2nth row of sub-pixels;

The (2n-1)th row of sub-pixels are a first type sub-pixel row, and the 2nth row of sub-pixels are a second type sub-pixel row.

In the specific implementation, the nth stage of first generation circuit provides the (2n-1)th row light emitting control signal for the (2n-1)th row light emitting control line; the nth stage of second generation circuit provides the 2nth row light emitting control signal for the 2nth row light emitting control line, that is, when the (2n-1)th row light emitting control line is an anti-peeping row light emitting control line and the 2nth row light emitting control line is a shared row light emitting control line, the nth stage of first generation circuit provides the anti-peeping row light emitting control line with a corresponding light emitting control signal, and the nth stage of second generation circuit provides the shared row light emitting control line with a corresponding light emitting control signal;

when the 2n-1th row light emitting control line is a shared row light emitting control line and the 2nth row light emitting control line is an anti-peeping row light emitting control line, the nth stage of first generation circuit provides the shared row light emitting control line with a corresponding light emitting control signal, and the nth stage of second generation circuit provides the anti-peeping row light emitting control line with a corresponding light emitting control signal.

Wherein, the anti-peeping row light emitting control line is electrically connected to the anti-peeping row sub-pixel, and the shared row light emitting control line is electrically connected to the shared row sub-pixel.

Figure 7:
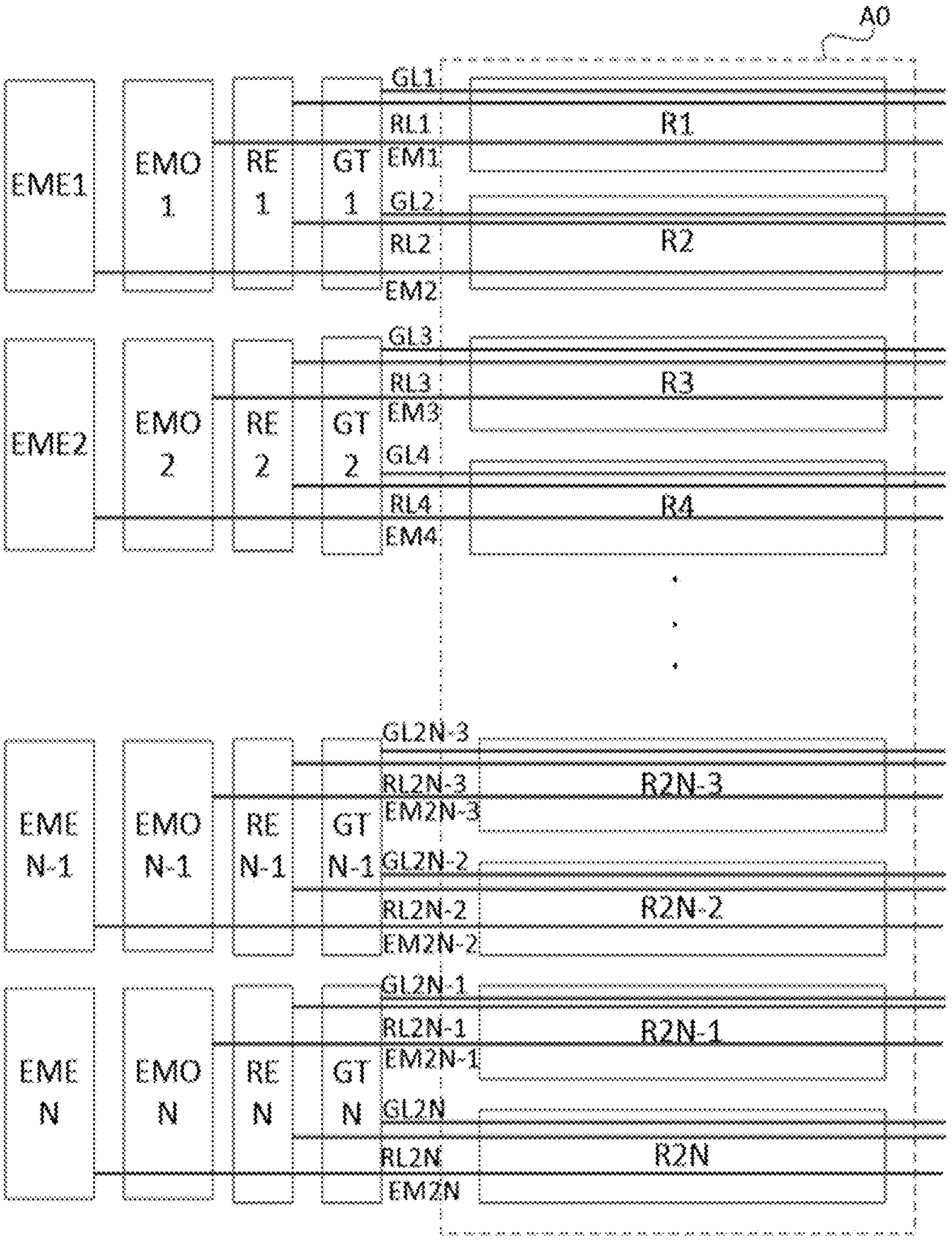
FIG. 7 is a structural diagram of a display panel according to at least one embodiment of the present disclosure.

As shown in FIG. 7, in at least one embodiment of the display panel shown in FIG. 5, the display panel described in at least one embodiment of the present disclosure further includes a light emitting control signal generation module;

The display panel described in at least one embodiment of the present disclosure further includes a first row light emitting control line EM1, a second row light emitting control line EM2, a third row light emitting control line EM3, a fourth row light emitting control line EM4, a (2N-3)th row light emitting control line EM2N-3, a (2N-2)th row light emitting control line EM2N-2, a (2N-1)th row light emitting control line EM2N-1, and a 2Nth row light emitting control line EM2N;

The light emitting control signal generation module includes a first stage of generation circuit, a second stage of generation circuit, an (N-1)th stage of generation circuit, and an Nth stage of generation circuit;

The first stage of generation circuit includes a first stage of first generation circuit EMO1 and a first stage of second generation circuit EME1, the second stage of generation circuit includes a second stage of first generation circuit EMO2 and a second stage of second generation circuit EME2, the (N-1)th stage of generation circuit includes an (N-1)th stage of first generation circuit EMO N-1 and the (N-1)th stage of second generation circuit EMEN-1, the Nth stage of generation circuit includes the Nth stage of first generation circuit EMON and the Nth stage of second generation circuit EMEN;

The light emitting control signal generation module is set on the left side of the display area A0;

EMO1 is configured to provide the first light emitting control signal for EM1, and EME1 is configured to provide the second light emitting control signal for EM2;

EMO2 is configured to provide the third light emitting control signal for EM3, and EME2 is configured to provide the fourth light emitting control signal for EM4;

EMON-1 is configured to provide the (2N-3)th light emitting control signal for EM2N-3, and EMEN-1 is configured to provide the (2N-2)th light emitting control signal for EM2N-2;

EMON is configured to provide the (2N-1)th light emitting control signal for EM2N-1, and EMEN is configured to provide the 2Nth light emitting control signal for EM2N.

Figure 8:
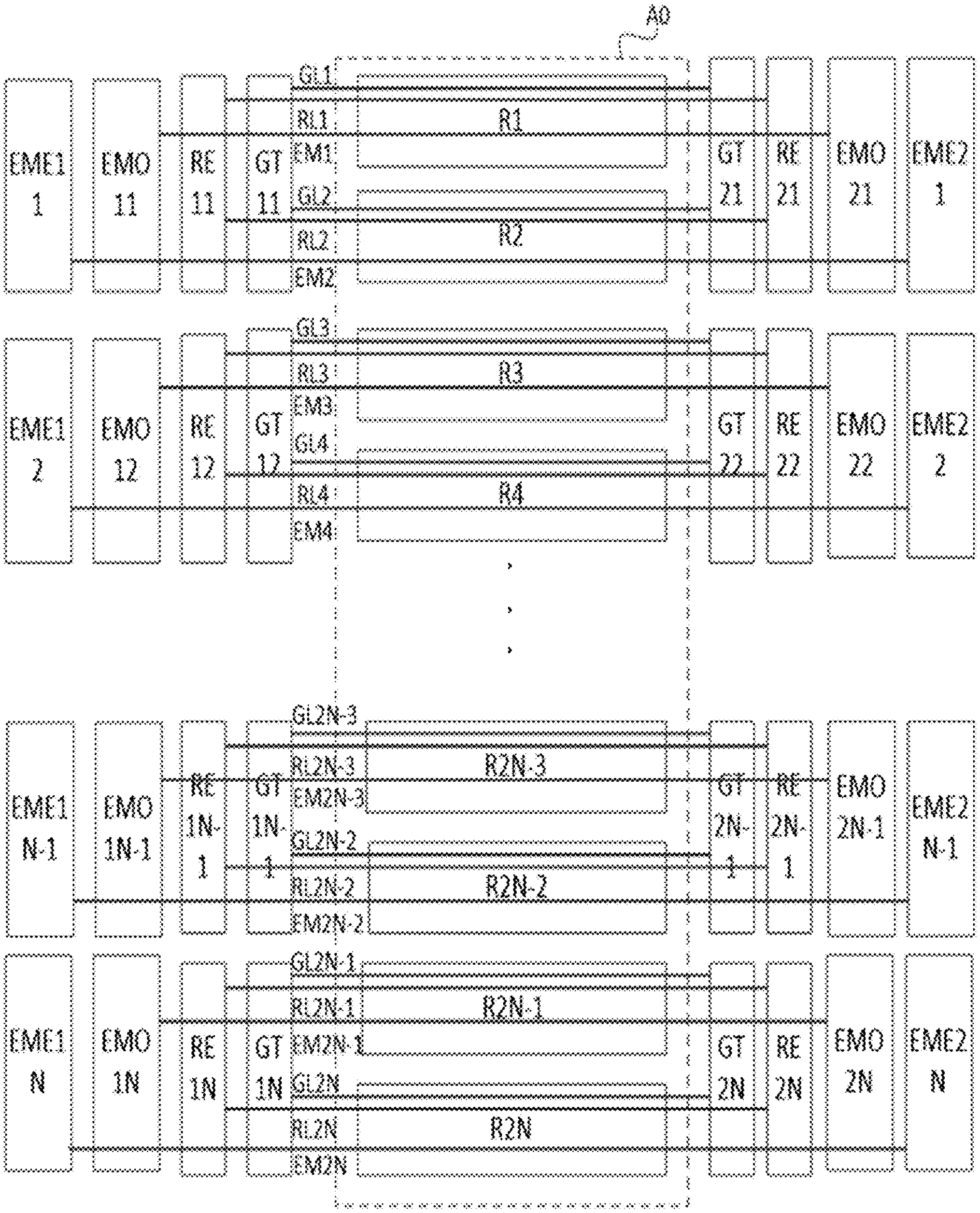
FIG. 8 is a structural diagram of a display panel according to at least one embodiment of the present disclosure.

In at least one embodiment of the display panel shown in FIG. 7,

When EM1, EM3, EM2N-3 and EM2N-1 are anti-peeping row light emitting control lines, and EM2, EM4, EM2N-2 and EM2N are shared row light emitting control lines, each stage of first generation circuits provide corresponding light emitting control signals for the anti-peeping row light emitting control lines, and each stage of second generation circuits provide corresponding light emitting control signals for the shared row light emitting control lines, so as to control the time division on of the anti-peeping row sub-pixels and the shared row sub-pixels, and realize the anti-peeping mode and the shared mode under the premise of improving the charging time of the sub-pixels;

When EM1, EM3, EM2N-3 and EM2N-1 are shared row light emitting control lines, and EM2, EM4, EM2N-2 and EM2N are anti-peeping row light emitting control lines, the each stage of first generation circuits provide corresponding light emitting control signals for the shared row light emitting control lines, As shown in FIG. 8, in at least one embodiment of the display panel shown in FIG. 6, the display panel described in at least one embodiment of the present disclosure includes a first light emitting control signal generation module and a second light emitting control signal generation module; the first light emitting control signal generation module is arranged on the left side of the display area; the second light emitting control signal generation module is arranged on the right side of the display area;

The display panel described in at least one embodiment of the present disclosure also includes a first row light emitting control line EM1, a second row light emitting control line EM2, a third row light emitting control line EM3, a fourth row light emitting control line EM4, a (2N-3)th row light emitting control line EM2N-3, a (2N-2)th row light emitting control line EM2N-2, a (2N-1)th row light emitting control line EM2N-1 and a 2Nth row light emitting control line EM2N;

The first stage of first generation circuit included in the first light emitting control signal generation module is labeled EMO11, and the second stage of first generation circuit included in the first light emitting control signal generation module is labeled EMO12, the (N-1)th stage of first generation circuit included in the first light emitting control signal generation module is labeled EMO1N-1, and the Nth stage of first generation circuit included in the first light emitting control signal generation module is labeled EMO1N;

The first stage of second generation circuit included in the first light emitting control signal generation module is labeled EME11, and the second stage of second generation circuit included in the first light emitting control signal generation module is labeled EME12, the (N-1)th stage of second generation circuit included in the first light emitting control signal generation module is labeled EME1N-1, and the Nth stage of second generation circuit included in the first light emitting control signal generation module is labeled EME1N;

The first stage of first generation circuit included in the second light emitting control signal generation module is labeled EMO21, and the second stage of first generation circuit included in the second light emitting control signal generation module is labeled EMO22, and the (N-1)th stage of first generation circuit included in the second light emitting control signal generation module is labeled EMO2N-1, the Nth stage of first generation circuit included in the second light emitting control signal generation module is labeled EMO2N;

The first stage of second generation circuit included in the second light emitting control signal generation module is labeled EME21, the second stage of second generation circuit included in the second light emitting control signal generation module is labeled EME22, the (N-1)th stage of second generation circuit included in the second light emitting control signal generation module is labeled EME2N-1, and the Nth stage of second generation circuit included in the second light emitting control signal generation module is labeled EME2N;

EMO11 is configured to provide the first first light emitting control signal for EM1, and EMO21 is configured to provide the second first light emitting control signal for EM1;

EME11 is configured to provide the first second light emitting control signal for EM2, and EME21 is configured to provide the second second light emitting control signal for EM2;

EMO12 is configured to provide the first third light emitting control signal for EM3, and EMO22 is configured to provide the second third light emitting control signal for EM3;

EME12 is configured to provide the first fourth light emitting control signal for EM4, and EME22 is configured to provide the second fourth light emitting control signal for EM4;

EMO1N-1 is configured to provide the first (2N-3)th light emitting control signal for EM2N-3, and EMO2N-1 is configured to provide the second (2N-3)th light emitting control signal for EM2N-3;

EME1N-1 is configured to provide the first (2N-2)th light emitting control signal for EM2N-2, and EME2*n*-1 is configured to provide the second (2N-2)th light emitting control signal for EM2N-2;

EMO1N is configured to provide the first (2N-1)th light emitting control signal for EM2N-1, and EMO2N is configured to provide the second (2N-1)th light emitting control signal for EM2N-1;

EME1N is configured to provide the first 2Nth light emitting control signal for EM2N, and EME2*n* is configured to provide the second 2Nth light emitting control signal for EM2N.

In at least one embodiment of the display panel shown in FIG. 8, when EM1, EM3, EM2N-3 and EM2N-1 are anti-peeping row light emitting control lines, and EM2, EM4, EM2N-2 and EM2N are shared row light emitting control lines, each stage of first generation circuits provide corresponding light emitting control signals for the anti-peeping row light emitting control lines, and each stage of second generation circuits provide corresponding light emitting control signals for the shared row light emitting control lines, so as to control the anti-peeping row sub-pixels and shared row sub-pixels to be turned on in time division mode, and realize the anti-peeping mode and the shared mode under the premise of improving the charging time of the sub-pixels;

When EM1, EM3, EM2N-3 and EM2N-1 are shared row light emitting control lines, and EM2, EM4, EM2N-2 and EM2N are anti-peeping row light emitting control lines, each stage of first generation circuits provide corresponding light emitting control signals for the shared row light emitting control lines, and each stage of second generation circuits provide corresponding light emitting control signals for the anti-peeping row light emitting control lines, so as to control the shared row sub-pixels and anti-peeping row sub-pixels to be turned on in time division mode, and realize the shared mode and the anti-peeping mode under the premise of improving the charging time of the sub-pixels.

Optionally, the ath stage of first generation circuit is electrically connected to the (4a-3)th row light emitting control lines and the (4a-1)th row light emitting control lines, respectively, and is configured to provide light emitting control signals for the (4a-3)th row light emitting control line and the (4a-1)th row light emitting control line;

The ath stage of second generation circuit is electrically connected to the (4a-2)th row light emitting control line and the 4ath row light emitting control line, respectively, and is configured to provide light emitting control signals for the (4a-2)th row light emitting control line and the 4ath row light emitting control line; a is a positive integer;

The (4a-1)th row light emitting control line is electrically connected to the (4a-1)th row of sub-pixels, the (4a-2)th row light emitting control line is electrically connected to the (4a-2)th row of sub-pixels, the (4a-3)th row light emitting control line is electrically connected to the (4a-3)th row of sub-pixels, and the 4ath row light emitting control line is electrically connected to the 4ath row of sub-pixels;

The (4a-1)th row of sub-pixels and the (4a-3)th row of sub-pixels are the first type of sub-pixel rows, and the (4a-2)th row of sub-pixels and the 4ath row of sub-pixels are the second type of sub-pixel rows.

In specific implementation, when the (4a-3)th row light emitting control line and the (4a-1)th row light emitting control line are anti-peep row light emitting control lines, and the (4a-2)th row light emitting control line and the 4ath row light emitting control line are shared row light emitting control lines, each stage of first generation circuit can provide light emitting control signals for the two anti-peep row light emitting control lines, and each stage of second generation circuit can provide light emitting control signals for the two shared row light emitting control lines;

When the (4a-3)th row light emitting control line and the (4a-1)th row light emitting control line are shared row light emitting control lines, and the (4a-2)th row light emitting control line and the 4ath row light emitting control line are anti-peep row light emitting control lines, each stage of first generation circuit can provide light emitting control signals for the two shared row light emitting control lines, and each stage of second generation circuit can provide light emitting control signals for the two anti-peep row light emitting control lines.

Optionally, the ath stage of first generation circuit is electrically connected to the (6a-5)th row light emitting control line, the (6a-3)th row light emitting control line and the (6a-5)th row light emitting control line, respectively, and is configured to provide light emitting control signals for the (6a-5)th row light emitting control line, the (6a-3)th row light emitting control line and the (6a-5)th row light emitting control line;

The ath stage of second generation circuit is electrically connected to the (6a-4)th row light emitting control line, the (6a-2)th row light emitting control line and the 6ath row light emitting control line, respectively, and is configured to provide light emitting control signals for the (6a-4)th row light emitting control line, the (6a-2)th row light emitting control line and the 6ath row light emitting control line; a is a positive integer;

The (6a-5)th row light emitting control line is electrically connected to the (6a-5)th row of sub-pixels, the (6a-4)th row light emitting control line is electrically connected to the (6a-4)th row of sub-pixels, the (6a-3)th row light emitting control line is electrically connected to the (6a-3)th row of sub-pixels, the (6a-2)th row light emitting control line is electrically connected to the (6a-2)th row of sub-pixels, the (6a-1)th row light emitting control line is electrically connected to the (6a-1)th row of sub-pixels, and the 6ath row light emitting control line is electrically connected to the 6ath row of sub-pixels; the (6a-5)th row of sub-pixels, the (6a-3)th row of sub-pixels and the (6a-1)th row of sub-pixels are the first type of sub-pixel row, and the (6a-4)th row of sub-pixels, the (6a-2)th row of sub-pixels and the 6ath row of sub-pixel are the second type of sub-pixel row.

In specific implementation, when the (6a-5)th row light emitting control line, the (6a-3)th row light emitting control line and the (6a-5)th row light emitting control line are anti-peeping row light emitting control lines, and the (6a-4)th row light emitting control line, the (6a-2)th row light emitting control line and the 6ath row light emitting control line are shared row light emitting control lines, each stage of first generation circuit can provide light emitting control signals for the three anti-peeping row light emitting control lines, and each stage of second generation circuit can provide light emitting control signals for the three shared row light emitting control lines;

When the (6a-5)th row light emitting control line, the (6a-3)th row light emitting control line and the (6a-5)th row light emitting control line are shared row light emitting control lines, and the (6a-4)th row light emitting control line, the (6a-2)th row light emitting control line and the 6ath row light emitting control line are anti-peeping row light emitting control lines, each stage of first generation circuit can provide light emitting control signals for the three shared row light emitting control lines, and each stage of second generation circuit can provide light emitting control signals for the three anti-peeping row light emitting control lines.

Optionally, the ath stage of first generation circuit is electrically connected to the (8a-7)th row light emitting control line, the (8a-5)th row light emitting control line, the (8a-3)th row light emitting control line and the (8a-1)th row light emitting control line, respectively, and is configured to provide light emitting control signals for the (8a-7)th row light emitting control line, the (8a-5)th row light emitting control line, the (8a-3)th row light emitting control line and the (8a-1)th row light emitting control line;

The ath stage of second generation circuit is electrically connected to the (8a-6)th row light emitting control line, the (8a-4)th row light emitting control line, the (8a-2)th row light emitting control line and the 8ath row light emitting control line, respectively, and is configured to provide light emitting control signals for the (8a-6)th row light emitting control line, the (8a-4)th row light emitting control line, the (8a-2)th row light emitting control line and the 8ath row light emitting control line; a is a positive integer;

The (8a-7)th row light emitting control line is electrically connected to the (8a-7)th row of sub-pixels, and the (8a-6)th row light emitting control line is electrically connected to the (8a-6)th row of sub-pixels, the (8a-5)th row light emitting control line is electrically connected to the (8a-5)th row of sub-pixels, the (8a-4)th row light emitting control line is electrically connected to the (8a-4)th row of sub-pixels, the (8a-3)th row light emitting control line is electrically connected to the (8a-3)th row of sub-pixels, the (8a-2)th row light emitting control line is electrically connected to the (8a-2)th row of sub-pixels, the (8a-1)th row light emitting control line is electrically connected to the (8a-1)th row of sub-pixels, and the 8ath row light emitting control line is electrically connected to the 8ath row of sub-pixels; the (8a-7)th row of sub-pixels, the (8a-5)th row of sub-pixels, the (8a-3)th row of sub-pixels and the (8a-1)th row of sub-pixels are the first type of sub-pixel row, and the (8a-6)th row of sub-pixels, the (8a-4)th row of sub-pixels, the (8a-2)th row of sub-pixels and the 8ath row of sub-pixels are the second type of sub-pixel row.

In a specific implementation, when the (8a-7)th row light emitting control line, the (8a-5)th row light emitting control line, the (8a-3)th row light emitting control line and the (8a-1)th row light emitting control line are anti-peep row light emitting control lines, the (8a-6)th row light emitting control line, the (8a-4)th row light emitting control line, the (8a-2)th row light emitting control line and the 8ath row light emitting control line, each stage of the first generation circuit can provide light emitting control signals for the four rows of anti-peep row light emitting control lines, and each stage of second generation circuit can provide light emitting control signals for the four rows of shared row light emitting control lines;

When the (8a-7)th row light emitting control line, (8a-5)th row light emitting control line, (8a-3)th row light emitting control line and (8a-1)th row light emitting control line are shared row light emitting control lines, the (8a-6)th row light emitting control line, (8a-4)th row light emitting control line, (8a-2)th row light emitting control line and 8ath row light emitting control line are shared row light emitting control lines, each stage of first generation circuit can provide light emitting control signals for the four shared row light emitting control lines, and each stage of second generation circuit can provide light emitting control signals for the four anti-peep row light emitting control lines.

Figure 9:
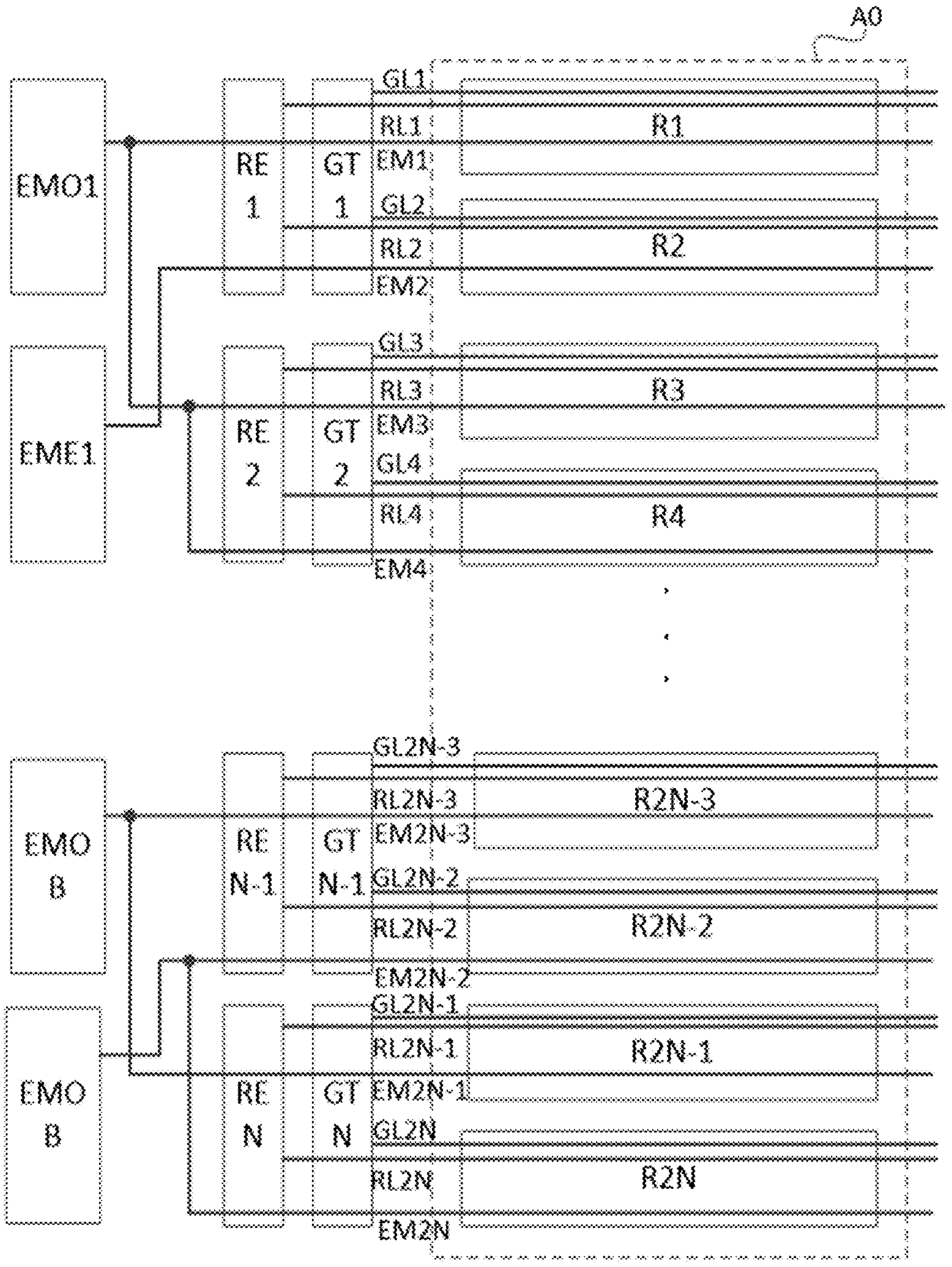
FIG. 9 is a structural diagram of a display panel according to at least one embodiment of the present disclosure FIG.

As shown in FIG. 9, based on at least one embodiment of the sub-pixel shown in FIG. 5, the display panel described in at least one embodiment of the present disclosure further includes a light emitting control signal generation module;

The display panel described in at least one embodiment of the present disclosure further includes a first row light emitting control line EM1, a second row light emitting control line EM2, a third row light emitting control line EM3, a fourth row light emitting control line EM4, a (2N-3)th row light emitting control line EM2N-3, a (2N-2)th row light emitting control line EM2N-2, a (2N-1)th row light emitting control line EM2N-1, and a 2Nth row light emitting control line EM2N;

The light emitting control signal generation module includes a first stage of generation circuit and a Bth stage of generation circuit;

The first stage of generation circuit includes the first stage of first generation circuit EMO1 and the first stage of second generation circuit EME1; the Bth stage of generation circuit includes the first stage of first generation circuit EMO1 and the first stage of second generation circuit EMEB;

B is a positive integer;

2B is equal to N;

EMO1 is configured to provide a light emitting control signal for EM1 and EM3;

EMOB is configured to provide a light emitting control signal for EM2N-3 and EM2N-1;

EME1 is configured to provide a light emitting control signal for EM2 and EM4;

EMEB is configured to provide a light emitting control signal for EM2N-2 and EM2N;

The light emitting control signal generation module is set on the left side of the display area A0.

In at least one embodiment of the display panel shown in FIG. 9, when EM1, EM3, EM2N-3 and EM2N-1 are anti-peeping row light emitting control lines, and EM2, EM4, EM2N-2 and EM2N are shared row light emitting control lines, each stage of first generation circuits provide corresponding light emitting control signals for the light emitting control lines of two adjacent anti-peeping row lines, and each stage of second generation circuits provide corresponding light emitting control signals for the light emitting control lines of two adjacent shared rows, so as to control the time division opening of the sub-pixels of the anti-peeping row and the sub-pixels of the shared row, and realize the anti-peeping mode and the shared mode under the premise of improving the charging time of the sub-pixels, and can reduce the number of stages of the first generation circuits, and reduce the number of stages of the second generation circuits, which is conducive to achieving a narrow frame;

When EM1, EM3, EM2N-3 and EM2N-1 are shared row light emitting control lines, and EM2, EM4, EM2N-2 and EM2N are anti-peep row light emitting control lines, each stage of first generation circuits provide corresponding light emitting control signals for the shared row light emitting control lines of two adjacent rows, and each stage of second generation circuits provide corresponding light emitting control signals for the light emitting control lines of two adjacent anti-peep rows, so as to control the time division opening of the shared row sub-pixels and the anti-peep row sub-pixels, and realize the shared mode and the anti-peep mode under the premise of improving the charging time of the sub-pixels, and can reduce the number of stages of the first generation circuits, and reduce the number of stages of the second generation circuits, which is conducive to achieving a narrow frame.

Figure 10:
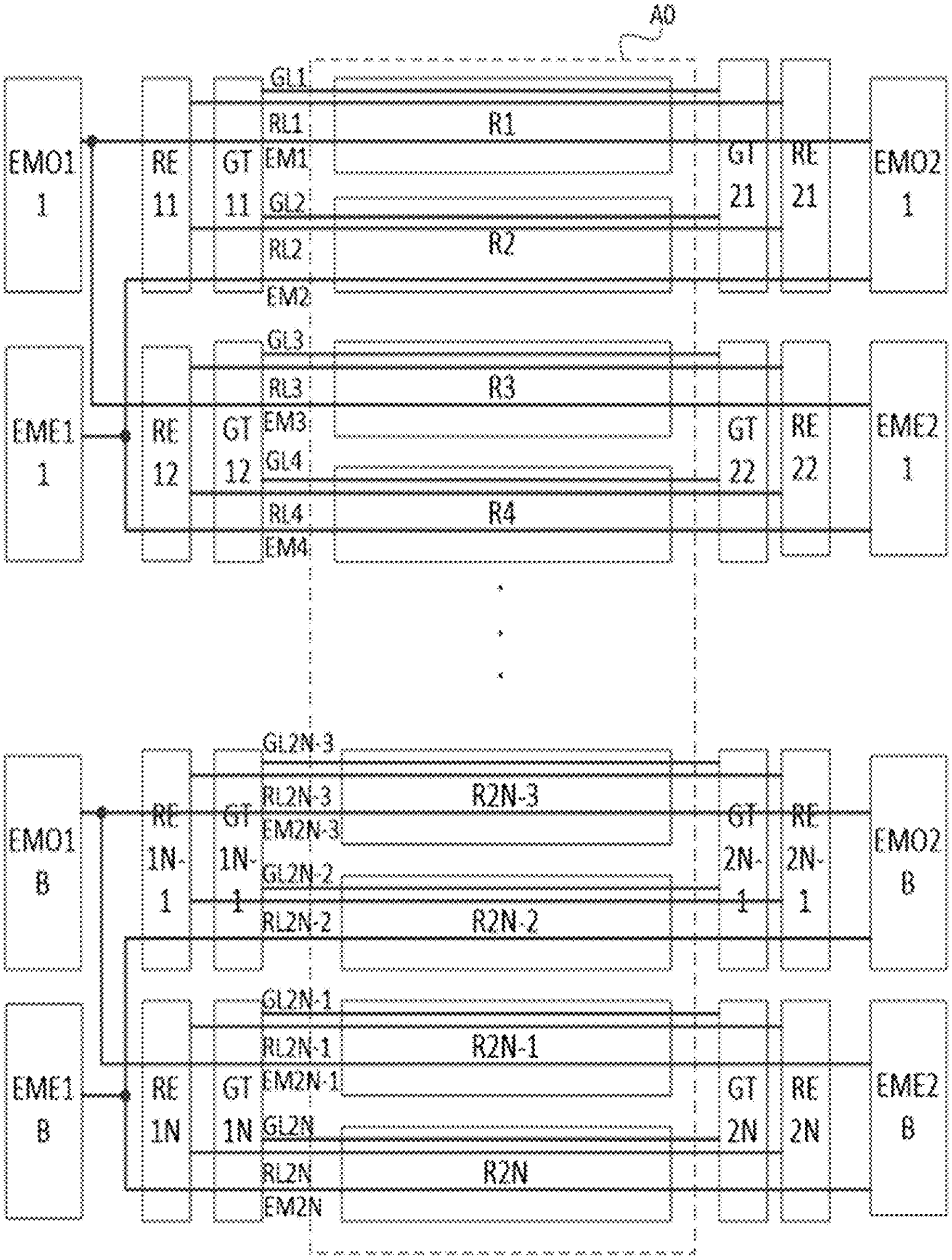
FIG. 10 is a structural diagram of a display panel according to at least one embodiment of the present disclosure.

As shown in FIG. 10, based on at least one embodiment of the display panel shown in FIG. 6, the display panel described in at least one embodiment of the present disclosure further includes a first light emitting control signal generation module and a second light emitting control signal generation module;

The display panel described in at least one embodiment of the present disclosure further includes a first row light emitting control line EM1, a second row light emitting control line EM2, a third row light emitting control line EM3, a fourth row light emitting control line EM4, a (2N-3)th row light emitting control line EM2N-3, a (2N-2)th row light emitting control line EM2N-2, a (2N-1)th row light emitting control line EM2N-1 and the 2Nth row light emitting control line EM2N;

The first stage of first generation circuit included in the first light emitting control signal generation module is labeled EMO11, and the Bth stage of first generation circuit included in the first light emitting control signal generation module is labeled EMO1B, where B is a positive integer;

The first stage of first generation circuit included in the second light emitting control signal generation module is labeled EMO21, and the Bth stage of first generation circuit included in the second light emitting control signal generation module is labeled EMO2B;

The first stage of second generation circuit included in the first light emitting control signal generation module is labeled EME11, the Bth stage of second generation circuit included in the first light emitting control signal generation module is labeled EME1B;

The first stage of second generation circuit included in the second light emitting control signal generation module is labeled EME21, and the Bth stage of second generation circuit included in the second light emitting control signal generation module is labeled EME2B;

2B is equal to N;

EMO11 is configured to provide light emitting control signals for EM1 and EM3; EMO21 is configured to provide light emitting control signals for EM1 and EM3;

EMO1B is configured to provide light emitting control signals for EM2N-3 and EM2N-1 signal; EMO2B is configured to provide light emitting control signals for EM2N-3 and EM2N-1;

EME11 is configured to provide light emitting control signals for EM2 and EM4; EME21 is configured to provide light emitting control signals for EM2 and EM4;

EME1B is configured to provide light emitting control signals for EM2N-2 and EM2N; EME2B is configured to provide light emitting control signals for EM2N-2 and EM2N;

The first light emitting control signal generation module is set on the left side of the display area A0;

The second light emitting control signal generation module is set on the right side of the display area A0.

In at least one embodiment of the display panel shown in FIG. 10, when EM1, EM3, EM2N-3 and EM2N-1 are anti-peeping row light emitting control lines, and EM2, EM4, EM2N-2 and EM2N are shared row light emitting control lines, each stage of first generation circuits provide corresponding light emitting control signals for two adjacent rows of anti-peeping row light emitting control lines, and each stage of second generation circuits provide corresponding light emitting control signals for two adjacent rows of shared row light emitting control lines, so as to control the time division opening of the anti-peeping row sub-pixels and the shared row sub-pixels, and realize the anti-peeping mode and the shared mode under the premise of improving the charging time of the sub-pixels, and can reduce the number of stages of the first generation circuits, and reduce the number of stages of the second generation circuits, which is conducive to achieving a narrow frame;

When EM1, EM3, EM2N-3 and EM2N-1 are shared row light emitting control lines, and EM2, EM4, EM2N-2 and EM2N are anti-peep row light emitting control lines, each stage of first generation circuits provide corresponding light emitting control signals for the shared row light emitting control lines of two adjacent rows, and each stage of second generation circuits provide corresponding light emitting control signals for the anti-peep row light emitting control lines of two adjacent rows, so as to control the time division opening of the shared row sub-pixels and the anti-peep row sub-pixels, and realize the shared mode and the anti-peep mode under the premise of improving the charging time of the sub-pixels, and can reduce the number of stages of the first generation circuits, and reduce the number of stages of the second generation circuits, which is conducive to achieving a narrow frame.

In at least one embodiment of the present disclosure, the generation circuit can be configured to provide light emitting control signals for at least one first type of sub-pixel row and at least one second type of sub-pixel row.

In at least one embodiment of the present disclosure, the nth stage of generation circuit includes an nth stage of generation unit and an nth stage of output control unit;

The nth stage of generation unit is configured to generate an nth light emitting control signal, and output the nth light emitting control signal through the nth light emitting control signal output terminal;

The input terminal of the nth stage of output control unit is electrically connected to the nth light emitting control signal output terminal, the first output terminal of the nth stage of output control unit is electrically connected to the (2n-1)th row light emitting control line, the second output terminal of the nth stage of output control unit is electrically connected to the 2nth row light emitting control line, and the nth stage of output control unit is configured to provide effective light emitting control signals to the (2n-1)th row light emitting control line and the 2nth row light emitting control line in time division mode according to the nth light emitting control signal provided by the nth light emitting control signal output terminal; n is an integer less than or equal to N, and N is an integer greater than 1.

In a specific implementation, the nth stage of generation circuit may include an nth stage of generation unit and an nth stage of output control unit; the nth stage of generation circuit may provide an nth light emitting control signal at an nth light emitting control signal output terminal, and the nth stage of output control unit may provide effective light emitting control signals to the (2n-1)th row light emitting control line and the 2nth row light emitting control line in a time division mode according to the nth light emitting control signal provided at the nth light emitting control signal output terminal.

Figure 11:
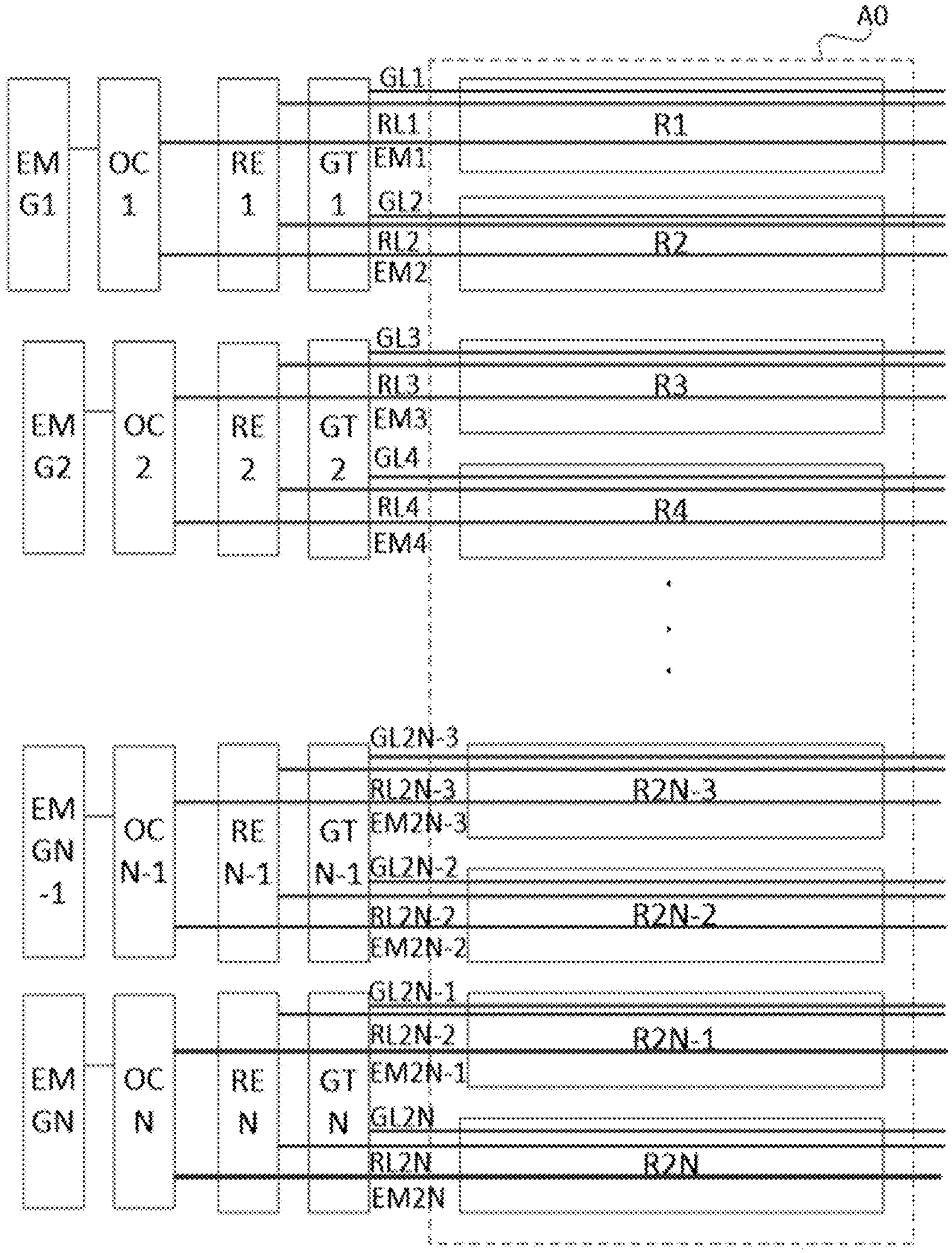
FIG. 11 is a structural diagram of a display panel according to at least one embodiment of the present disclosure.

As shown in FIG. 11, based on at least one embodiment of the display panel shown in FIG. 5, the display panel described in at least one embodiment of the present disclosure further includes a first row light emitting control line EM1, a second row light emitting control line EM2, a third row light emitting control line EM3, a fourth row light emitting control line EM4, a (2N-3)th row light emitting control line EM2N-3, a (2N-2)th row light emitting control line EM2N-2, a (2N-1)th row light emitting control line EM2N-1, and a 2Nth row light emitting control line EM2N;

The display panel described in at least one embodiment of the present disclosure further includes a light emitting control signal generation module;

The light emitting control signal generation module includes a first stage of generation circuit, a second stage of generation circuit, an (N-1)th stage of generation circuit, and an Nth stage of generation circuit;

The first stage of generation circuit includes a first stage of generation unit EMG1 and a first stage of output control unit OC1; the second stage of generation circuit includes a second stage of generation unit EMG2 and a second stage of output control unit OC2; the (N-1)th stage of generation circuit includes an (N-1)th stage of generation unit EMG N-1 and an (N-1)th stage of output control unit OC N-1; the Nth generation circuit includes an Nth generation unit EMGN and an Nth output control unit OCN;

The output terminal of EMG1 is the first light emitting control signal output terminal, the output terminal of EMG2 is the second light emitting control signal output terminal, the output terminal of EMGN-1 is the (N-1)th light emitting control signal output terminal, and the output terminal of EMGN is the Nth light emitting control signal output terminal;

The input terminal of the first stage of output control unit OC1 is electrically connected to the first light emitting control signal output terminal, the first output terminal of the first stage of output control unit OC1 is electrically connected to the first row light emitting control line EM1, and the second output terminal of the first stage of output control unit OC1 is electrically connected to the second row light emitting control line EM2; OC1 is configured to provide corresponding light emitting control signals for EM1 and EM2 to control EM1 and EM2 to turning on in a time division mode;

The input terminal of the second stage of output control unit OC2 is electrically connected to the second light emitting control signal output terminal, the first output terminal of the second stage of output control unit OC2 is electrically connected to the third row light emitting control line EM3, and the second output terminal of the second stage of output control unit OC2 is electrically connected to the fourth row light emitting control line EM4; OC 2 is configured to provide corresponding light emitting control signals for EM3 and EM4, and control EM3 and EM4 to turn on in a time division mode;

The input terminal of the (N-1)th stage of output control unit OCN-1 is electrically connected to the (N-1)th stage of light emitting control signal output terminal, the first output terminal of the (N-1)th stage of output control unit OCN-1 is electrically connected to the (2N-3)th row light emitting control line EM2N-3, and the second output terminal of the (N-1)th stage of output control unit OCN-1 is electrically connected to the (2N-2)th row light emitting control line EM2N-2; OCN-1 is configured to provide EM2N-3 and EM2N-2 with corresponding light emitting control signals to control EM2N-3 and EM2N-2 to turn on in time division mode;

The input terminal of the Nth stage of output control unit OCN is electrically connected to the Nth light emitting control signal output terminal, the first output terminal of the Nth stage of output control unit OCN is electrically connected to the (2n-1)th row light emitting control line EM2N-1, and the second output terminal of the second stage of output control unit OC2 is electrically connected to the fourth row light emitting control line EM2N; OCN is configured to provide corresponding light emitting control signals to EM2N-1 and EM2N to control EM2N-1 and EM2N to turn on in a time division mode.

At least one embodiment of the display panel shown in FIG. 11 is in operation, when EM1, EM3, EM2N-3 and EM2N-1 are anti-peeping row light emitting control lines, and EM2, EM4, EM2N-2 and EM2N are shared row light emitting control lines, or when EM1, EM3, EM2N-3 and EM2N-1 are shared row light emitting control lines, and EM2, EM4, EM2N-2 and EM2N are anti-peeping row light emitting control lines, each stage of output control units can control the adjacent row light emitting control lines to be turned on in a time division mode, so as to control the anti-peeping row light emitting control lines and the shared row light emitting control lines to be turned on in a time division mode, and control the anti-peeping row sub-pixels and the shared row sub-pixels to be turned on in a time division mode, and realize the anti-peeping mode and the shared mode under the premise of improving the charging time of the sub-pixels, and can reduce the number of stages of the first generation circuits, reduce the number of stages of the second generation circuits, and facilitate the realization of a narrow frame.

Figure 12:
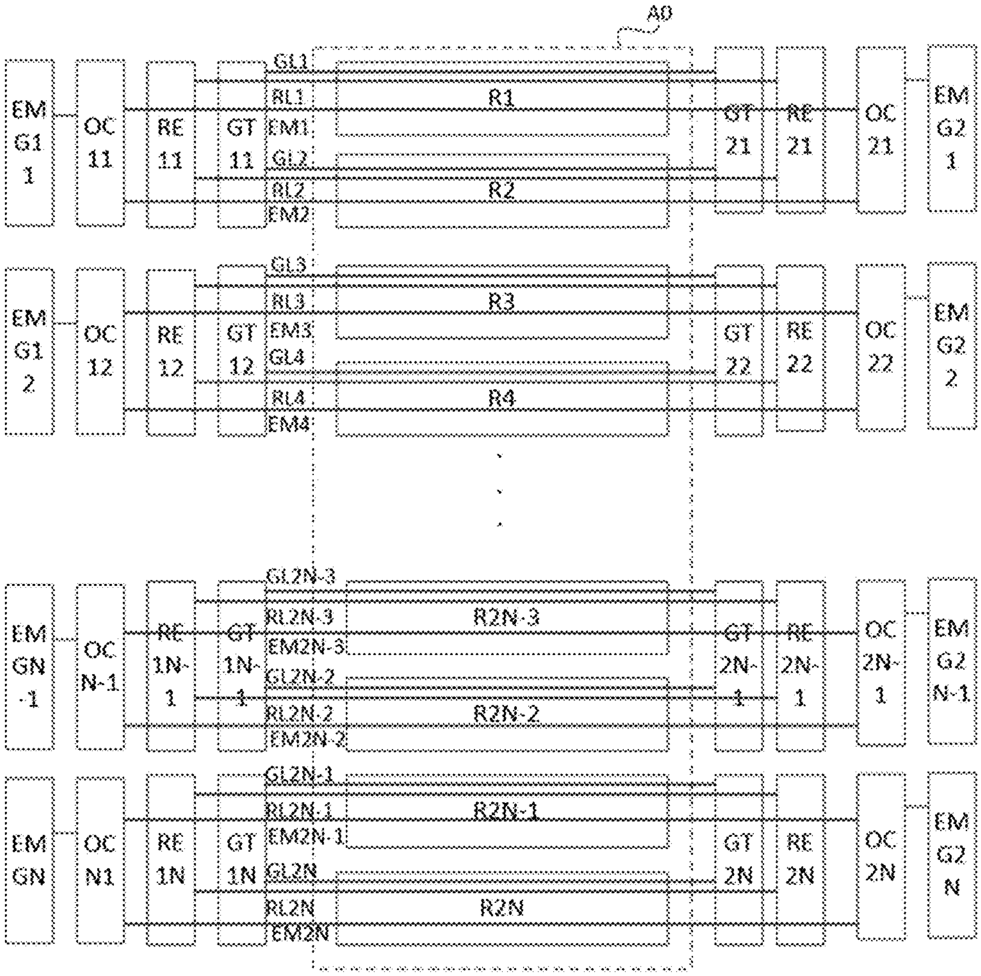
FIG. 12 is a structural diagram of a display panel according to at least one embodiment of the present disclosure.

As shown in FIG. 12, based on at least one embodiment of the display panel shown in FIG. 6, the display panel described in at least one embodiment of the present disclosure further includes a first row light emitting control line EM1, a second row light emitting control line EM2, a third row light emitting control line EM3, a fourth row light emitting control line EM4, a 2N-3 row light emitting control line EM2N-3, a 2N-2 row light emitting control line EM2N-2, a 2N-1 row light emitting control line EM2N-1, and a 2N row light emitting control line EM2N;

The display panel described in at least one embodiment of the present disclosure further includes a first light emitting control signal generation module and a second light emitting control signal generation module;

The first light emitting control signal generation module is arranged on the left side of the display area A0, and the second light emitting control signal generation module is arranged on the right side of the display area A0;

The first stage of generation unit included in the first light emitting control signal generation module is labeled EMG11, the second stage of generation unit included in the first light emitting control signal generation module is labeled EMG12, the (N-1)th stage of generation unit included in the first light emitting control signal generation module is labeled EMG1N-1, and the Nth stage of generation unit included in the first light emitting control signal generation module is labeled EMG1N;

The first stage of generation unit included in the second light emitting control signal generation module is labeled EMG21, and the second stage of generation unit included in the second light emitting control signal generation module is labeled EMG 22, the (N-1)th stage of generation unit included in the second light emitting control signal generation module is labeled EMG2N-1, and the Nth stage of generation unit included in the second light emitting control signal generation module is labeled EMG2N;

The first stage of output control unit included in the first light emitting control signal generation module is labeled OC11, the second stage of output control unit included in the first light emitting control signal generation module is labeled OC12, the (N-1)th stage of output control unit included in the first light emitting control signal generation module is labeled OC1N-1, and the Nth stage of output control unit included in the first light emitting control signal generation module is labeled OC1N;

The first stage of output control unit included in the second light emitting control signal generation module is labeled OC21, the second stage of output control unit included in the second light emitting control signal generation module is labeled OC22, the (N-1)th stage of output control unit included in the second light emitting control signal generation module is labeled OC2N-1, and the Nth stage of output control unit included in the second light emitting control signal generation module is labeled OC2N;

The input terminal of OC11 is electrically connected to the output terminal of EMG11, the first output terminal of OC11 is electrically connected to the first row light emitting control line EM1, and the second output terminal of OC11 is electrically connected to the second row light emitting control line EM2; OC11 is configured to provide corresponding light emitting control signals for EM1 and EM2, and control EM 1 and EM2 to turn on in a time division mode;

The input terminal of OC21 is electrically connected to the output terminal of EMG21, the first output terminal of OC21 is electrically connected to the first row light emitting control line EM1, and the second output terminal of OC21 is electrically connected to the second row light emitting control line EM2; OC11 is configured to provide corresponding light emitting control signals for EM1 and EM2 to control EM1 and EM2 to turn on in a time division mode;

The input terminal of OC12 is electrically connected to the output terminal of EMG12, the first output terminal of OC12 is electrically connected to the third row light emitting control line EM3, and the second output terminal of OC12 is electrically connected to the fourth row light emitting control line EM4; OC12 is configured to provide corresponding light emitting control signals for EM3 and EM4 to control EM 3 and EM4 to turn on in a time division mode;

The input terminal of OC22 is electrically connected to the output terminal of EMG22, the first output terminal of OC22 is electrically connected to the third row light emitting control line EM3, and the second output terminal of OC22 is electrically connected to the fourth row light emitting control line EM4; OC22 is configured to provide corresponding light emitting control signals for EM3 and EM4 to control EM3 and EM4 to turn on in a time division mode;

The input terminal of OC1N-1 is electrically connected to the output terminal of EMG1N-1, the first output terminal of OC1N-1 is electrically connected to the (2N-3)th row light emitting control line EM2N-3, and the second output terminal of OC1N-1 is electrically connected to the (2N-2)th row light emitting control line EM2N-2; OC1N-1 is configured to provide corresponding light emitting control signals for EMG1N-1, the first output terminal of OC1N-1 is electrically connected to the (2N-3)th row light emitting control line EM2N-3, and the second output terminal of OC1N-1 is electrically connected to the (2N-2)th row light emitting control line EM2N-2; M2N-3 and EM2N-2 provide corresponding light emitting control signals to control EM2N-3 and EM2N-2 to turn on in a time division mode;

The input terminal of OC2N-1 is electrically connected to the output terminal of EMG2N-1, the first output terminal of OC2N-1 is electrically connected to the (2N-3)th row light emitting control line EM2N-3, and the second output terminal of OC2N-1 is electrically connected to the (2N-2)th row light emitting control line EM2N-2; OC2N-1 is configured to provide corresponding light emitting control signals to EM2N-3 and EM2N-2 to control EM2N-3 and EM2N-2 to turn on in a time division mode;

The input terminal of OC1N is electrically connected to the output terminal of EMG1N, and the first output terminal of OC1N is electrically connected to the (2N-1)th row light emitting control line EM2N-1, and the second output terminal of OC1N is electrically connected to the 2Nth row light emitting control line EM2N; OC1N-1 is configured to provide corresponding light emitting control signals for EM2N-1 and EM2N, and control EM2N-1 and EM2N to turn on in a time division mode;

The input terminal of OC2N is electrically connected to the output terminal of EMG2N, the first output terminal of OC2N is electrically connected to the (2N-1)th row light emitting control line EM2N-1, and the second output terminal of OC2N is electrically connected to the 2Nth row light emitting control line EM2N; OC2N-1 is configured to provide corresponding light emitting control signals for EM2N-1 and EM2N, and control EM2N-1 and EM2N to turn on in a time division mode.

In at least one embodiment of the present disclosure, the output control unit includes a first control module, a second control module, a third control module and a fourth control module;

The first control module is electrically connected to the first control terminal, the input terminal of the output control unit and the first output terminal of the output control unit respectively, and is configured to control to connect the input terminal and the first output terminal under the control of the first control signal provided by the first control terminal;

The second control module is electrically connected to the second control terminal, the first voltage line and the first output terminal of the output control unit respectively, and is configured to control to connect the first voltage line and the first output terminal under the control of the second control signal provided by the second control terminal;

The third control module is electrically connected to the first control terminal, the first voltage line and the second output terminal of the output control unit respectively, and is configured to control to connect the first voltage line and the second output terminal under the control of the first control signal provided by the first control terminal;

The fourth control module is electrically connected to the second control terminal, the input terminal and the second output terminal respectively, and is configured to control to connect the input terminal and the second output terminal under the control of the second control signal provided by the second control terminal.

In a specific implementation, the output control unit may include a first control module, a second control module, a third control module and a fourth control module; the first control module controls to connect the input terminal and the first output terminal under the control of a first control signal; the second control module controls to connect the first voltage line and the first output terminal under the control of the second control signal; the third control module controls to connect the first voltage line and the second output terminal under the control of the first control signal; the fourth control module controls to connect the input terminal and the second output terminal under the control of the second control signal.

In at least one embodiment of the present disclosure, the first voltage line may be a high voltage line, but is not limited thereto.

Figure 13:
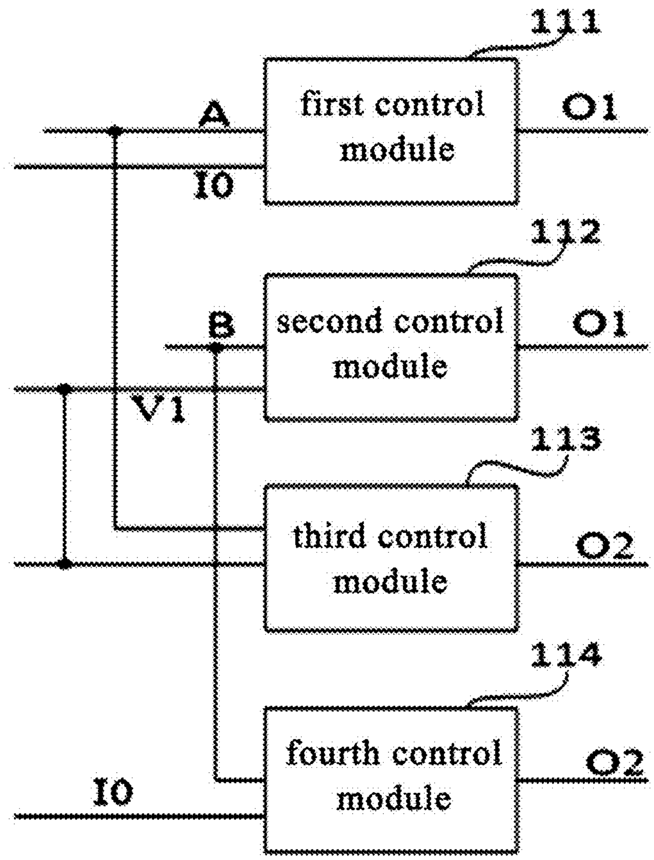
FIG. 13 is a structural diagram of an output control unit according to at least one embodiment of the present disclosure.

As shown in FIG. 13, the output control unit includes a first control module 111, a second control module 112, a third control module 113 and a fourth control module 114;

The first control module 111 is electrically connected to the first control terminal A, the input terminal I0 of the output control unit and the first output terminal O1 of the output control unit, respectively, and is configured to control to connect the input terminal I0 and the first output terminal O1 under the control of the first control signal provided by the first control terminal A;

The second control module 112 is electrically connected to the second control terminal B, the first voltage line V1 and the first output terminal O1 of the output control unit, respectively, and is configured to control to connect the first voltage line V1 and the first output terminal O1 under the control of the second control signal provided by the second control terminal B;

The third control module 113 is electrically connected to the first control terminal A, the first voltage line V1 and the second output terminal O2 of the output control unit respectively, and is configured to control to connect the first voltage line V1 and the second output terminal O2 under the control of the first control signal provided by the first control terminal A;

The fourth control module 114 is electrically connected to the second control terminal B, the input terminal I0 and the second output terminal O2 respectively, and is configured to control to connect the input terminal I0 and the second output terminal O2 under the control of the second control signal provided by the second control terminal B.

In a specific implementation, the first voltage line can be a high voltage line.

Figure 14:
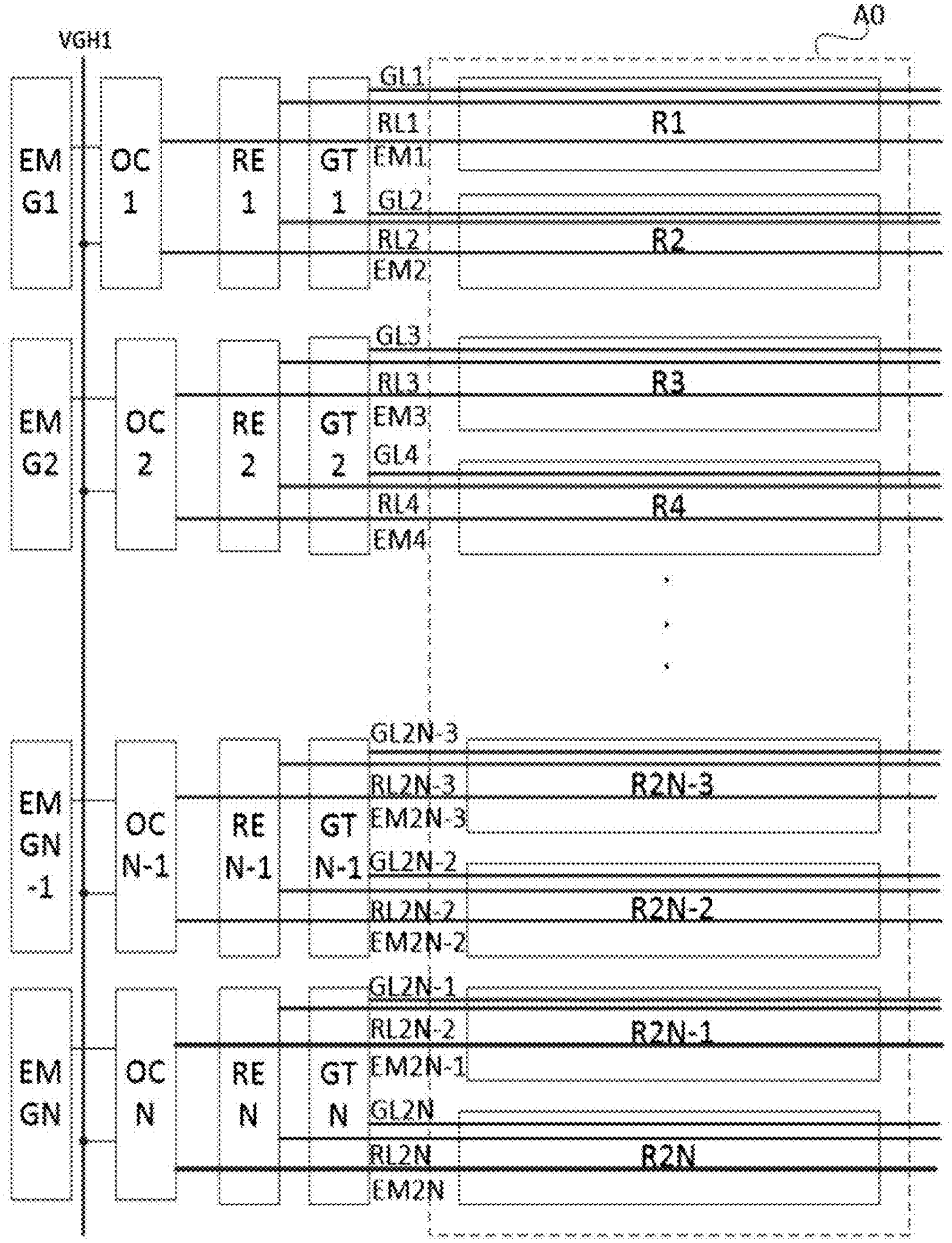
FIG. 14 is a structural diagram of a display panel according to at least one embodiment of the present disclosure.

As shown in FIG. 14, based on at least one embodiment of the display panel shown in FIG. 11, at least one embodiment of the display panel further includes a first high voltage line VGH1;

OC1, OC2, OCN-1 and OCN are all electrically connected to the first high voltage line VGH1, and are configured to generate corresponding light emitting control signals according to the high voltage signal provided by the first high voltage line VGH1.

Figure 15:
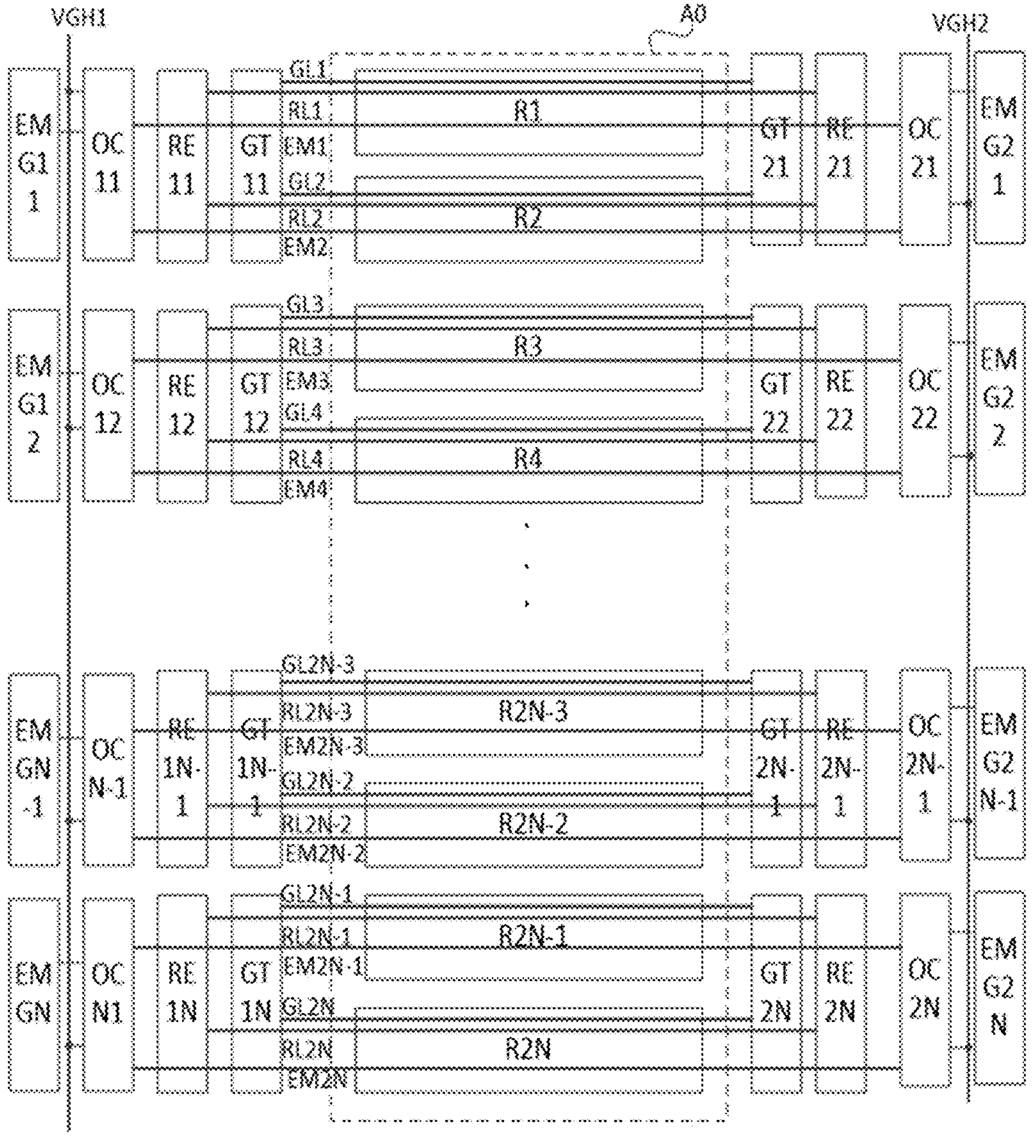
FIG. 15 is a structural diagram of a display panel according to at least one embodiment of the present disclosure.

As shown in FIG. 15, based on at least one embodiment of the display panel shown in FIG. 12, at least one embodiment of the display panel further includes a first high voltage line VGH1 and a second high voltage line VGH2;

OC11, OC12, OC1N-1 and OC1N are all electrically connected to the first high voltage line VGH1, and are configured to generate corresponding light emitting control signals according to the high voltage signal provided by the first high voltage line VGH1;

OC21, OC22, OC2N-1 and OC2N are all electrically connected to the second high voltage line VGH2, and are configured to generate corresponding light emitting control signals according to the high voltage signal provided by the second high voltage line VGH2.

Optionally, the first control module includes a first control transistor, the second control module includes a second control transistor, the third control module includes a third control transistor, and the fourth control module includes a fourth control transistor;

- a gate electrode of the first control transistor is electrically connected to the first control terminal, a first electrode of the first control transistor is electrically connected to the input terminal of the output control unit, and a second electrode of the first control transistor is electrically connected to the first output terminal of the output control unit;
- a gate electrode of the second control transistor is electrically connected to the second control terminal, a first electrode of the second control transistor is electrically connected to the first voltage line, and a second electrode of the second control transistor is electrically connected to the first output terminal of the output control unit;
- a gate electrode of the third control transistor is electrically connected to the first control terminal, a first electrode of the third control transistor is electrically connected to the first voltage line, and a second electrode of the third control transistor is electrically connected to the second output terminal of the output control unit;
- a gate electrode of the fourth control transistor is electrically connected to the second control terminal, a first electrode of the fourth control transistor is electrically connected to the input terminal of the output control unit, and a second electrode of the fourth control transistor is electrically connected to the second output terminal of the output control unit.

Figure 16:
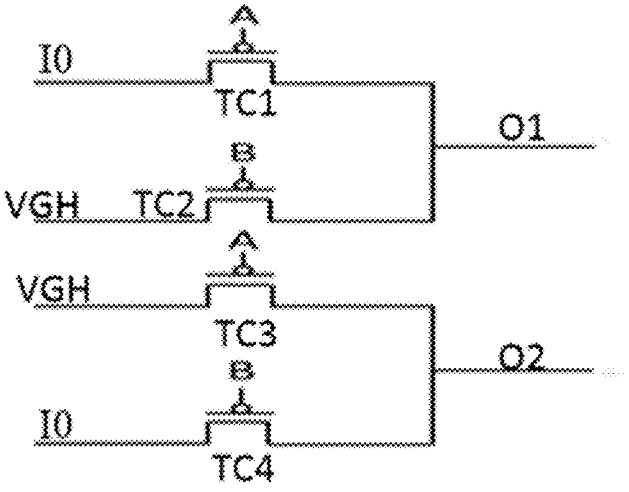
FIG. 16 is a circuit diagram of the output control unit according to at least one embodiment of the present disclosure.

As shown in FIG. 16, based on at least one embodiment of the output control unit shown in FIG. 13, the first control module includes a first control transistor TC1, the second control module includes a second control transistor TC2, the third control module includes a third control transistor TC3, and the fourth control module includes a fourth control transistor TC4;

The gate electrode of the first control transistor TC1 is electrically connected to the first control terminal A, the source electrode of the first control transistor TC1 is electrically connected to the input terminal I0 of the output control unit, and the drain electrode of the first control transistor TC1 is electrically connected to the first output terminal O1 of the output control unit;

The gate electrode of the second control transistor TC2 is electrically connected to the second control terminal B, and the source electrode of the second control transistor TC2 is electrically connected to the high voltage line VGH, and the drain electrode of the second control transistor TC2 is electrically connected to the first output terminal O1 of the output control unit;

The gate electrode of the third control transistor TC3 is electrically connected to the first control terminal A, the source electrode of the third control transistor TC3 is electrically connected to the high voltage line VGH, and the drain electrode of the third control transistor TC3 is electrically connected to the second output terminal O2 of the output control unit;

The gate electrode of the fourth control transistor TC4 is electrically connected to the second control terminal B, the source electrode of the fourth control transistor TC4 is electrically connected to the input terminal I0 of the output control unit, and the drain electrode of the fourth control transistor TC4 is electrically connected to the second output terminal O2 of the output control unit.

In at least one embodiment of the output control unit shown in FIGS. 16, TC1, TC2, TC3 and TC4 can all be p-type transistors.

At least one embodiment of the output control unit shown in FIG. 16 is in operation.

When A provides a low voltage signal and B provides a high voltage signal, TC1 is turned on, TC2 is turned off, TC3 is turned on, TC4 is turned off, I0 is connected to O1, VGH is connected to O2, and when I0 provides a low voltage signal, O1 provides a low voltage signal and O2 provides a high voltage signal;

When A provides a high voltage signal and B provides a low voltage signal, TC1 is turned off, TC2 is turned on, TC3 is turned off, TC4 is turned on, VGH is connected to O1, I0 is connected to O2, and when I0 provides a low voltage signal, O1 provides a high voltage signal and O2 provides a low voltage signal.

When at least one embodiment of the output control unit shown in FIG. 16 is in operation, A provides a low voltage signal, the potential of A is the second low voltage Vgl2, and when A is a high voltage signal, the potential of A is the second high voltage Vgh2;

When B provides a low voltage signal, the potential of B is the second low voltage Vgl2, and when B is a high voltage signal, the potential of B is the second high voltage Vgh2;

When I0 provides a low voltage signal, the potential of I0 is the first low voltage Vgl1, and the voltage value of the high voltage signal provided by VGH is the first high voltage Vgh1;

Vgh2 is greater than Vgh1, and Vgl2 is less than Vgl1, so that when each transistor is turned off, the transistor can be completely turned off, and when each transistor is turned on, the transistor can be completely turned on.

Optionally, at least one embodiment of the sub-pixel includes a light emitting element, a driving circuit, a data writing-in circuit, a reset circuit, a first light emitting control circuit and a second light emitting control circuit;

a control terminal of the driving circuit is electrically connected to a first node, a first terminal of the driving circuit is electrically connected to a second node, and a second terminal of the driving circuit is electrically connected to a third node;

The data writing-in circuit is electrically connected to the scanning line, the data line and the second node N2 respectively, and is configured to write the display data voltage provided by the data line into the second node under the control of the scanning signal provided by the scanning line;

The reset circuit is electrically connected to the reset control line, the first initial voltage terminal and the first node respectively, and is configured to write the first initial voltage provided by the first initial voltage terminal into the first node under the control of the scanning signal provided by the scanning line;

The first light emitting control circuit is electrically connected to the light emitting control line, the power supply voltage terminal and the second node respectively, and is configured to control to connect or disconnect the power supply voltage terminal and the second node under the control of the light emitting control signal provided by the light emitting control line;

The second light emitting control circuit is electrically connected to the light emitting control line, the third node and the first electrode of the light emitting element respectively, and is configured to control to connect or disconnect the third node and the first electrode of the light emitting element under the control of the light emitting control signal;

The second electrode of the light emitting element is electrically connected to the first voltage terminal.

In at least one embodiment of the present disclosure, the first voltage terminal can be a low voltage terminal, but is not limited thereto.

Optionally, at least one embodiment of the sub-pixel may further include a compensation control circuit, an initialization circuit and an energy storage circuit;

The compensation control circuit is electrically connected to the scanning line, the first node and the third node respectively, and is configured to control to connect or disconnect the first node and the third node under the control of the scanning signal provided by the scanning line;

The initialization circuit is electrically connected to the scanning line, the second initial voltage terminal and the first electrode of the light emitting element respectively, and is configured to write the second initial voltage provided by the second initial voltage terminal into the first electrode of the light emitting element under the control of the scanning signal;

The energy storage circuit is electrically connected to the first node, and is configured to maintain the potential of the first node.

Figure 17:
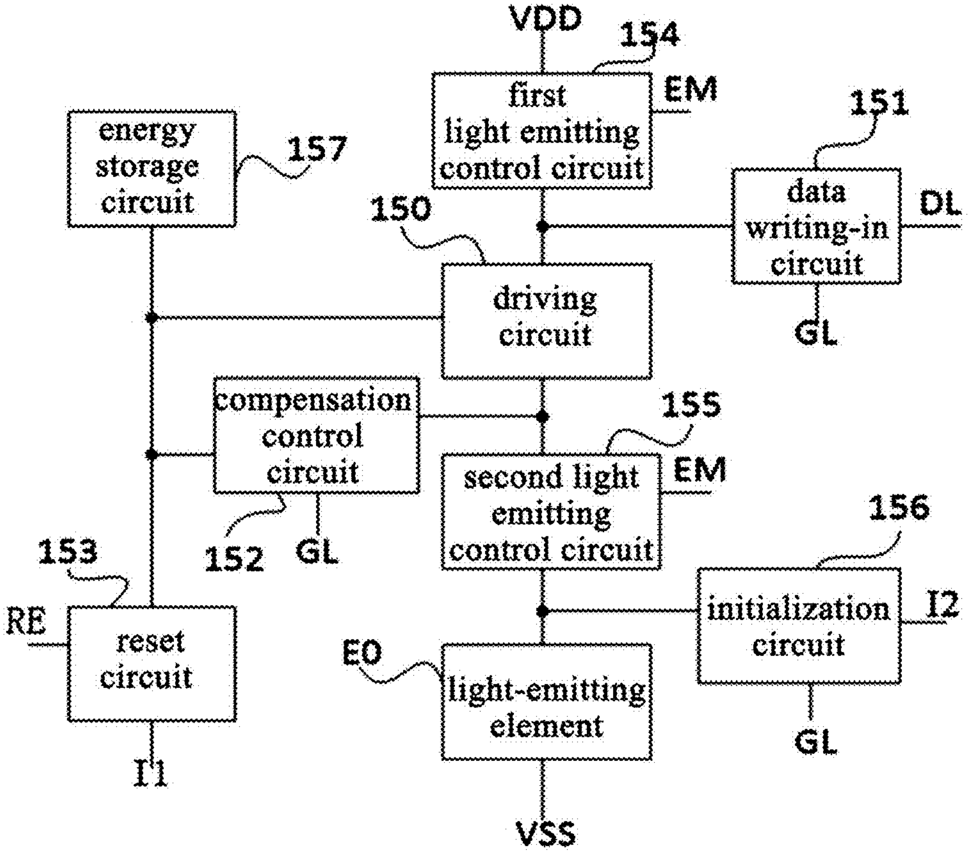
FIG. 17 is a structural diagram of a sub-pixel according to at least one embodiment of the present disclosure.

As shown in FIG. 17, in the display panel described in at least one embodiment of the present disclosure, at least one embodiment of the sub-pixel includes a light emitting element E0, a driving circuit 150, a data writing-in circuit 151, a compensation control circuit 152, a reset circuit 153, a first light emitting control circuit 154, a second light emitting control circuit 155, an initialization circuit 156 and an energy storage circuit 157;

The control terminal of the driving circuit 150 is electrically connected to the first node N1, the first terminal of the driving circuit 150 is electrically connected to the second node N2, and the second terminal of the driving circuit 150 is electrically connected to the third node N3;

The data writing-in circuit 151 is electrically connected to the scanning line GL, the data line DT and the second node N2 respectively, and is configured to write the display data voltage provided by the data line DT into the second node N2 under the control of the scanning signal provided by the scanning line GL;

The compensation control circuit 152 is electrically connected to the scanning line GL, the first node N1 and the third node N3 respectively, and is configured to control to connect or disconnect the first node N1 and the third node N3 under the control of the scanning signal provided by the scanning line GL;

The reset circuit 53 is electrically connected to the reset control line RE, the first initial voltage terminal I1 and the first node N1 respectively, is configured to write the first initial voltage provided by the first initial voltage terminal I1 into the first node N1 under the control of the reset control signal provided by the reset control line RE;

The first light emitting control circuit 154 is electrically connected to the light emitting control line EM, the power supply voltage terminal VDD and the second node N2 respectively, and is configured to control to connect or disconnect the power supply voltage terminal VDD and the second node N2 under the control of the light emitting control signal provided by the light emitting control line EM;

The second light emitting control circuit 155 is electrically connected to the light emitting control line EM, the third node N3 and the first electrode of the light emitting element E0 respectively, and is configured to control to connect or disconnect the third node N3 and the first electrode of the light emitting element E0 under the control of the light emitting control signal;

The initialization circuit 156 is electrically connected to the scanning line GL, the second initial voltage terminal I2 and the first electrode of the light emitting element E0 respectively, and is configured to write the second initial voltage provided by the second initial voltage terminal I2 into the first electrode of the light emitting element E0 under the control of the scanning signal;

The energy storage circuit 157 is electrically connected to the first node N1, and is configured to maintain the potential of the first node N1;

The second electrode of the light emitting element E0 is electrically connected to the low voltage terminal VSS.

Figure 18:
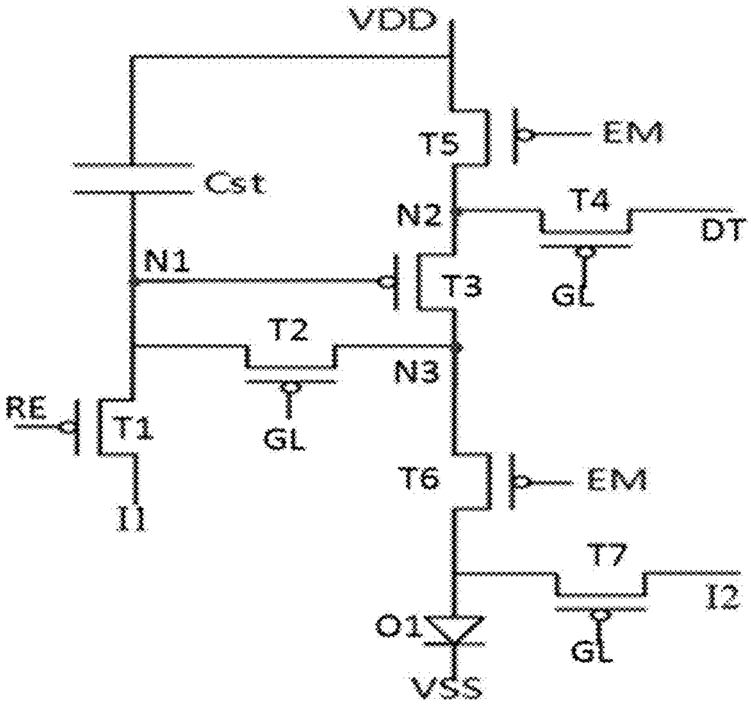
FIG. 18 is a circuit diagram of the sub-pixel according to at least one embodiment of the present disclosure.

As shown in FIG. 18, based on at least one embodiment of the sub-pixel shown in FIG. 17, the reset circuit includes a first transistor T1, the compensation control circuit includes a second transistor T2, the driving circuit includes a third transistor T3, the data writing-in circuit includes a fourth transistor T4, the first light emitting control circuit includes a fifth transistor T5, the second light emitting control circuit includes a sixth transistor T6, and the initialization circuit includes a seventh transistor T7; the energy storage circuit includes a storage capacitor Cst; the light emitting element is an organic light emitting diode O1;

The gate electrode of T1 is electrically connected to the reset control line RE, the source electrode of T1 is electrically connected to the first initial voltage terminal I1, and the drain electrode of T1 is electrically connected to the first node N1;

The gate electrode of T2 is electrically connected to the scanning line GL, the source electrode of T2 is electrically connected to the second node N2, and the drain electrode of T2 is electrically connected to the third node N3;

The gate electrode of T3 is electrically connected to the first node N1, the source electrode of T3 is electrically connected to the second node N2, and the drain electrode of T3 is electrically connected to the third node N3;

The gate electrode of T4 is electrically connected to the scanning line GL, the source electrode of T4 is electrically connected to the data line DT, and the drain electrode of T4 is electrically connected to the second node N2;

The gate electrode of T5 is electrically connected to the light emitting control line EM, the source electrode of T5 is electrically connected to the power supply voltage terminal VDD, and the drain electrode of T5 is electrically connected to the second node N2;

The gate electrode of T6 is electrically connected to the light emitting control line EM, the source electrode of T6 is electrically connected to the third node N3, and the drain electrode of T6 is electrically connected to the anode of the organic light emitting diode O1;

The cathode of O1 is electrically connected to the low voltage terminal VSS;

The gate electrode of T7 is electrically connected to the scanning line GL, the source electrode of T7 is electrically connected to the second initial voltage terminal I2, and the drain electrode of T7 is electrically connected to the anode of O1;

The first terminal of Cst is electrically connected to the first node N1, and the second terminal of Cst is electrically connected to the power supply voltage terminal VDD.

The display device described in the embodiment of the present disclosure includes the above-mentioned display panel.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A display panel, comprising a plurality of rows and a plurality of columns of sub-pixels, a plurality of rows of scanning lines, a first driving module and a light emitting control signal generation module; wherein the sub-pixel is electrically connected to the scanning line and are configured to access a display data voltage under the control of a scanning signal provided by the scanning line;

the first driving module includes a plurality of stages of first driving circuits; the light emitting control signal generation module includes a plurality of stages of generation circuits;

the first driving circuit is configured to provide a scanning signal for two adjacent rows of sub-pixels;

the generation circuit is configured to provide a light emitting control signal for at least two rows of sub-pixels;

the plurality of rows and the plurality of columns of sub-pixels include a plurality of first-type sub-pixel rows and a plurality of second-type sub-pixel rows;

a type of the first-type sub-pixel row is different from a type of the second-type sub-pixel row, and wherein the generation circuit includes a first generation circuit and a second generation circuit;

the first generation circuit is configured to provide a light emitting control signal for at least one row of the first type of sub-pixel row;

the second generation circuit is configured to provide a light emitting control signal for at least one row of the second type of sub-pixel row.

2. The display panel according to claim 1, wherein the first-type sub-pixel row and the second-type sub-pixel row are alternately arranged.

3. The display panel according to claim 1, wherein the first-type sub-pixel row is an anti-peeping row of sub-pixels, and the second-type sub-pixel row is a shared row of sub-pixels; or, the first-type sub-pixel row is the shared row of sub-pixels, and the second-type sub-pixel row is the anti-peeping row of sub-pixels.

4. The display panel according to claim 1, wherein the display panel further comprises a base substrate and a light-gathering structure;

the sub-pixel, the light-gathering structure, the scanning line, the first driving module and the light emitting control signal generation module are all arranged on the base substrate;

the light-gathering structure is arranged on a side of the anti-peeping row of sub-pixel away from the base substrate, and is configured to gather a light emitted by the anti-peeping row of sub-pixels.

5. The display panel according to claim 4, wherein the focusing structure includes a microlens and/or a light shading structure;

the light shading structure surrounds an opening area corresponding to the anti-peeping row of sub-pixels.

6. The display panel according to claim 1, wherein the sub-pixel is arranged in a display area; the first driving module is arranged in a peripheral area;

the display panel comprises a first driving module, and the first driving module is arranged on a first side or a second side of the display area; or, the display panel comprises a first first driving module and a second first driving module, the first first driving module is arranged on the first side of the display area, and the second first driving module is arranged on the second side of the display area;

the first side and the second side are opposite sides.

7. The display panel according to claim 1, further comprising a plurality of rows of reset control lines and a second driving module; the second driving module includes an N stages of second driving circuits; the sub-pixel includes a reset circuit, a driving circuit and a light emitting element; the driving circuit is configured to generate a driving current for driving the light emitting element under the control of a potential of a control terminal of the driving circuit;

the reset circuit is electrically connected to the reset control line, and is configured to provide an initial voltage to the control terminal of the driving circuit under the control of a reset control signal provided by the reset control line;

an nth stage of second driving circuit is electrically connected to a (2n-1)th row reset control line and a 2nth row reset control line, respectively, and is configured to provide an nth reset control signal for the (2n-1)th row reset control line and the 2nth row reset control line;

N is an integer greater than 1, n is a positive integer less than or equal to N, wherein the sub-pixel is arranged in the display area; the second driving module is arranged in the peripheral area;

the display panel includes a second driving module, and the second driving module is arranged on the first side or the second side of the display area; or, the display panel includes a first second driving module and a second second driving module, the first second driving module is arranged on the first side of the display area, and the second second driving module is arranged on the second side of the display area;

the first side and the second side are opposite sides.

8. The display panel according to claim 1, wherein the sub-pixel is arranged in the display area; the light emitting control signal generation module is arranged in the peripheral area;

the display panel includes a light emitting control signal generation module, and the light emitting control signal generation module is arranged on the first side or the second side of the display area; or, the display panel includes a first light emitting control signal generation module and a second light emitting control signal generation module; the first light emitting control signal generation module is arranged on the first side of the display area; the second light emitting control signal generation module is arranged on the second side of the display area;

the first side and the second side are opposite sides.

9. The display panel according to claim 1, wherein the sub-pixel includes a driving circuit and a light emitting element; the driving circuit is configured to drive the light emitting element to emit light under the control of a potential of the control terminal of the driving circuit;

the sub-pixel also includes a first light emitting control circuit and/or a second light emitting control circuit;

the first light emitting control circuit is electrically connected to the light emitting control line, the power supply voltage terminal and the first terminal of the driving circuit respectively, and is configured to control to connect or disconnect the power supply voltage terminal and the first terminal of the driving circuit under the control of the light emitting control signal provided by the light emitting control line;

the second light emitting control circuit is electrically connected to the light emitting control line, the second terminal of the driving circuit and the light emitting element respectively, and is configured to control to connect or disconnect the second terminal of the driving circuit and the light emitting element under the control of the light emitting control signal provided by the light emitting control line.

10. The display panel according to claim 1, wherein the nth stage of first generation circuit is electrically connected to the (2n-1)th row light emitting control line, and is configured to provide a (2n-1)th row light emitting control signal for the (2n-1)th row light emitting control line;

the nth stage of second generation circuit is electrically connected to the 2nth row light emitting control line, and is configured to provide a 2nth row light emitting control signal for the 2nth row light emitting control line;

n is a positive integer less than or equal to N, and N is an integer greater than 1;

the (2n-1)th row light emitting control line is electrically connected to the (2n-1)th row of sub-pixels, and the 2nth row light emitting control line is electrically connected to the 2nth row of sub-pixels;

the (2n-1)th row of sub-pixels are a first type sub-pixel row, and the 2nth row of sub-pixels are a second type sub-pixel row.

11. The display panel according to claim 1, wherein an ath stage of first generation circuit is electrically connected to an (4a-3)th row light emitting control lines and an (4a-1)th row light emitting control lines, respectively, and is configured to provide light emitting control signals for the (4a-3)th row light emitting control line and the (4a-1)th row light emitting control line;

an ath stage of second generation circuit is electrically connected to a (4a-2)th row light emitting control line and a 4ath row light emitting control line, respectively, and is configured to provide light emitting control signals for the (4a-2)th row light emitting control line and the 4ath row light emitting control line; a is a positive integer;

the (4a-1)th row light emitting control line is electrically connected to the (4a-1)th row of sub-pixels, the (4a-2)th row light emitting control line is electrically connected to the (4a-2)th row of sub-pixels, the (4a-3)th row light emitting control line is electrically connected to the (4a-3)th row of sub-pixels, and the 4ath row light emitting control line is electrically connected to the 4ath row of sub-pixels;

the (4a-1)th row of sub-pixels and the (4a-3)th row of sub-pixels are the first type of sub-pixel row, and the (4a-2)th row of sub-pixels and the 4ath row of sub-pixels are the second type of sub-pixel row.

12. The display panel according to claim 1, wherein an ath stage of first generation circuit is electrically connected to a (6a-5)th row light emitting control line, a (6a-3)th row light emitting control line and a (6a-5)th row light emitting control line, respectively, and is configured to provide light emitting control signals for the (6a-5)th row light emitting control line, the (6a-3)th row light emitting control line and the (6a-5)th row light emitting control line;

the ath stage of second generation circuit is electrically connected to a (6a-4)th row light emitting control line, a (6a-2)th row light emitting control line and a 6ath row light emitting control line, respectively, and is configured to provide light emitting control signals for the (6a-4)th row light emitting control line, the (6a-2)th row light emitting control line and the bath row light emitting control line; a is a positive integer;

the (6a-5)th row light emitting control line is electrically connected to the (6a-5)th row of sub-pixels, the (6a-4)th row light emitting control line is electrically connected to the (6a-4)th row of sub-pixels, the (6a-3)th row light emitting control line is electrically connected to the (6a-3)th row of sub-pixels, the (6a-2)th row light emitting control line is electrically connected to the (6a-2)th row of sub-pixels, the (6a-1)th row light emitting control line is electrically connected to the (6a-1)th row of sub-pixels, and the 6ath row light emitting control line is electrically connected to the bath row of sub-pixels; the (6a-5)th row of sub-pixels, the (6a-3)th row of sub-pixels and the (6a-1)th row of sub-pixels are the first type of sub-pixel row, and the (6a-4)th row of sub-pixels, the (6a-2)th row of sub-pixels and the 6ath row of sub-pixel are the second type of sub-pixel row.

13. The display panel according to claim 1, wherein a ath stage of first generation circuit is electrically connected to a (8a-7)th row light emitting control line, a (8a-5)th row light emitting control line, a (8a-3)th row light emitting control line and a (8a-1)th row light emitting control line, respectively, and is configured to provide light emitting control signals for the (8a-7)th row light emitting control line, the (8a-5)th row light emitting control line, the (8a-3)th row light emitting control line and the (8a-1)th row light emitting control line;

an ath stage of second generation circuit is electrically connected to a (8a-6)th row light emitting control line, a (8a-4)th row light emitting control line, a (8a-2)th row light emitting control line and a 8ath row light emitting control line, respectively, and is configured to provide light emitting control signals for the (8a-6)th row light emitting control line, the (8a-4)th row light emitting control line, the (8a-2)th row light emitting control line and the 8ath row light emitting control line; a is a positive integer;

the (8a-7)th row light emitting control line is electrically connected to the (8a-7)th row of sub-pixels, and the (8a-6)th row light emitting control line is electrically connected to the (8a-6)th row of sub-pixels, the (8a-5)th row light emitting control line is electrically connected to the (8a-5)th row of sub-pixels, the (8a-4)th row light emitting control line is electrically connected to the (8a-4)th row of sub-pixels, the (8a-3)th row light emitting control line is electrically connected to the (8a-3)th row of sub-pixels, the (8a-2)th row light emitting control line is electrically connected to the (8a-2)th row of sub-pixels, the (8a-1)th row light emitting control line is electrically connected to the (8a-1)th row of sub-pixels, and the 8ath row light emitting control line is electrically connected to the 8ath row of sub-pixels; the (8a-7)th row of sub-pixels, the (8a-5)th row of sub-pixels, the (8a-3)th row of sub-pixels and the (8a-1)th row of sub-pixels are the first type of sub-pixel row, and the (8a-6)th row of sub-pixels, the (8a-4)th row of sub-pixels, the (8a-2)th row of sub-pixels and the 8ath row of sub-pixels are the second type of sub-pixel row.

14. The display panel according to claim 1, wherein, the generation circuit is configured to provide a light emitting control signal for at least one first type sub-pixel row and at least one second type sub-pixel row.

15. The display panel according to claim 14, wherein the nth stage of generation circuit includes an nth stage of generation unit and an nth stage of output control unit;

the nth stage of generation unit is configured to generate an nth light emitting control signal, and output the nth light emitting control signal through the nth light emitting control signal output terminal;

an input terminal of the nth stage of output control unit is electrically connected to the nth light emitting control signal output terminal, a first output terminal of the nth stage of output control unit is electrically connected to the (2n-1)th row light emitting control line, a second output terminal of the nth stage of output control unit is electrically connected to the 2nth row light emitting control line, and the nth stage of output control unit is configured to provide effective light emitting control signals to the (2n-1)th row light emitting control line and the 2nth row light emitting control line in a time division mode according to the nth light emitting control signal provided by the nth light emitting control signal output terminal; n is an integer less than or equal to N, and N is an integer greater than 1.

16. The display panel according to claim 15, wherein the (2n-1)th row light emitting control line is electrically connected to the (2n-1)th row of sub-pixels, and the 2nth row light emitting control line is electrically connected to the 2nth row of sub-pixels;

the (2n-1)th row of sub-pixels are a first type of sub-pixel row, and the 2nth row of sub-pixels are a second type of sub-pixel row.

17. The display panel according to claim 15, wherein the output control unit includes a first control module, a second control module, a third control module and a fourth control module;

the first control module is electrically connected to the first control terminal, the input terminal of the output control unit and the first output terminal of the output control unit respectively, and is configured to control to connect the input terminal and the first output terminal under the control of the first control signal provided by the first control terminal;

the second control module is electrically connected to the second control terminal, the first voltage line and the first output terminal of the output control unit respectively, and is configured to control to connect the first voltage line and the first output terminal under the control of the second control signal provided by the second control terminal;

the third control module is electrically connected to the first control terminal, the first voltage line and the second output terminal of the output control unit respectively, and is configured to control to connect the first voltage line and the second output terminal under the control of the first control signal provided by the first control terminal;

the fourth control module is electrically connected to the second control terminal, the input terminal and the second output terminal respectively, and is configured to control to connect the input terminal and the second output terminal under the control of the second control signal provided by the second control terminal wherein the first control module includes a first control transistor, the second control module includes a second control transistor, the third control module includes a third control transistor, and the fourth control module includes a fourth control transistor;

a gate electrode of the first control transistor is electrically connected to the first control terminal, a first electrode of the first control transistor is electrically connected to the input terminal of the output control unit, and a second electrode of the first control transistor is electrically connected to the first output terminal of the output control unit;

a gate electrode of the second control transistor is electrically connected to the second control terminal, a first electrode of the second control transistor is electrically connected to the first voltage line, and a second electrode of the second control transistor is electrically connected to the first output terminal of the output control unit;

a gate electrode of the third control transistor is electrically connected to the first control terminal, a first electrode of the third control transistor is electrically connected to the first voltage line, and a second electrode of the third control transistor is electrically connected to the second output terminal of the output control unit;

a gate electrode of the fourth control transistor is electrically connected to the second control terminal, a first electrode of the fourth control transistor is electrically connected to the input terminal of the output control unit, and a second electrode of the fourth control transistor is electrically connected to the second output terminal of the output control unit.

18. The display panel according to claim 1, wherein the sub-pixel comprises a light emitting element, a driving circuit, a data writing-in circuit, a reset circuit, a first light emitting control circuit and a second light emitting control circuit;

a control terminal of the driving circuit is electrically connected to a first node, a first terminal of the driving circuit is electrically connected to a second node, and a second terminal of the driving circuit is electrically connected to a third node;

the data writing-in circuit is electrically connected to the scanning line, the data line and the second node N2 respectively, and is configured to write a display data voltage provided by the data line into the second node under the control of the scanning signal provided by the scanning line;

the reset circuit is electrically connected to the reset control line, the first initial voltage terminal and the first node respectively, and is configured to write the first initial voltage provided by the first initial voltage terminal into the first node under the control of the reset control signal provided by the reset control line RE;

the first light emitting control circuit is electrically connected to the light emitting control line, the power supply voltage terminal and the second node respectively, and is configured to control to connect or disconnect the power supply voltage terminal and the second node under the control of the light emitting control signal provided by the light emitting control line;

the second light emitting control circuit is electrically connected to the light emitting control line, the third node and the first electrode of the light emitting element respectively, and is configured to control to connect or disconnect the third node and the first electrode of the light emitting element under the control of the light emitting control signal;

the second electrode of the light emitting element is electrically connected to a first voltage terminal.

19. A display device, comprising a display panel according to claim 1.

* * * * *